US008559344B2

(12) United States Patent
Abusch-Magder et al.

(10) Patent No.: US 8,559,344 B2
(45) Date of Patent: Oct. 15, 2013

(54) METHOD AND APPARATUS FOR DYNAMICALLY CREATING AND UPDATING BASE STATION NEIGHBOR LISTS

(75) Inventors: David Abusch-Magder, Maplewood, NJ (US); Suman Das, Colonia, NJ (US); Thierry Etienne Klein, Fanwood, NJ (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1585 days.

(21) Appl. No.: 11/771,607

(22) Filed: Jun. 29, 2007

(65) Prior Publication Data

US 2009/0003279 A1  Jan. 1, 2009

(51) Int. Cl.
*H04B 7/00* (2006.01)

(52) U.S. Cl.
USPC ........... 370/310; 370/332; 370/328; 370/341; 370/329; 455/404.1; 455/453; 455/512; 455/513; 455/521; 455/525

(58) Field of Classification Search
USPC ......... 370/331, 310, 328, 338, 329, 332, 341, 370/431; 455/403, 404.1, 422.1, 450, 453, 455/509, 412, 513, 515, 521, 522, 524, 525
See application file for complete search history.

(56) References Cited

U.S. PATENT DOCUMENTS

| 5,982,758 | A | * | 11/1999 | Hamdy | 370/331 |
| 6,119,005 | A | | 9/2000 | Smolik | |
| 6,360,098 | B1 | * | 3/2002 | Ganesh et al. | 455/436 |
| 6,950,417 | B2 | * | 9/2005 | Soliman | 370/335 |
| 7,065,361 | B1 | | 6/2006 | Fortuna | |
| 2002/0061751 | A1 | * | 5/2002 | Zhao | 455/442 |
| 2006/0276189 | A1 | * | 12/2006 | Kiernan et al. | 455/436 |
| 2007/0010251 | A1 | * | 1/2007 | Cho et al. | 455/436 |
| 2007/0086388 | A1 | * | 4/2007 | Kang et al. | 370/331 |
| 2007/0173261 | A1 | * | 7/2007 | Priotti et al. | 455/450 |
| 2007/0191016 | A1 | * | 8/2007 | Beasley et al. | 455/442 |

FOREIGN PATENT DOCUMENTS

| WO | WO 2007/027034 A | 3/2007 |
| WO | WO 2008/054072 A | 5/2008 |

OTHER PUBLICATIONS

PCT/US2008/008035—Search Report and Written Opinion, Nov. 24, 2008, Lucent Technologies Inc.

(Continued)

*Primary Examiner* — Ajit Patel
(74) *Attorney, Agent, or Firm* — Wall & Tong, LLP

(57) ABSTRACT

The invention includes a method and apparatus for creating a base station neighbor list at a target base station in a wireless network including a plurality of base stations. A method includes obtaining information for creating the base station neighbor list, creating the base station neighbor list using the obtained information, and storing the base station neighbor list. The obtained information includes at least one of geographic locations of ones of the base stations, network status information associated with the wireless network, and pilot signal strength measurement feedback information. The base station neighbor list includes a subset of the base stations of the network. The base stations of the base station neighbor list may be prioritized using at least a portion of the obtained information. The base station neighbor list may be updated periodically, or in response to changes to the obtained information. The base station neighbor list is distributed from the base station to wireless user devices served by the base station for use by the wireless user devices in making handoff decisions.

25 Claims, 13 Drawing Sheets

(56) References Cited

OTHER PUBLICATIONS

"911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.

* cited by examiner

800

900

1000

METHOD AND APPARATUS FOR DYNAMICALLY CREATING AND UPDATING BASE STATION NEIGHBOR LISTS

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

In order to support mobility of a mobile device across base stations (e.g., from a base station currently serving the user device to a neighboring base station), the mobile device must know the identity of neighboring base stations. Without such neighboring base station information, the mobile device must instead search for all possible base stations in the area which could potentially serve the mobile device, a process which consumes an enormous amount of resources. Disadvantageously, while an accurate neighbor list reduces the search space for the mobile device during a handoff, neighbor lists are currently created manually, which is quite a laborious process. Furthermore, in mobile wireless networks in which base stations are mobile, base station neighbors change much more often than in fixed wireless networks in which base stations are fixed and, thus, manually created neighbor lists quickly become outdated.

SUMMARY OF THE INVENTION

Various deficiencies in the prior art are addressed through the invention of a method and apparatus for creating a base station neighbor list at a target base station in a wireless network including a plurality of base stations. A method includes obtaining information for creating the base station neighbor list, creating the base station neighbor list using the obtained information, and storing the base station neighbor list. The obtained information includes at least one of geographic locations of ones of the base stations, network status information associated with the wireless network, and pilot signal strength measurement feedback information. The base station neighbor list includes a subset of the base stations of the network. The base stations of the base station neighbor list may be prioritized using at least a portion of the obtained information. The base station neighbor list may be updated periodically, or in response to changes to the obtained information. The base station neighbor list is distributed from the base station to wireless user devices served by the base station for use by the wireless user devices in making handoff decisions.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of activating base stations in a rapidly deployable wireless network (denoted herein as a 911 network on wheels, i.e., 911-NOW); however, the present invention is applicable to activating base stations in various other networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
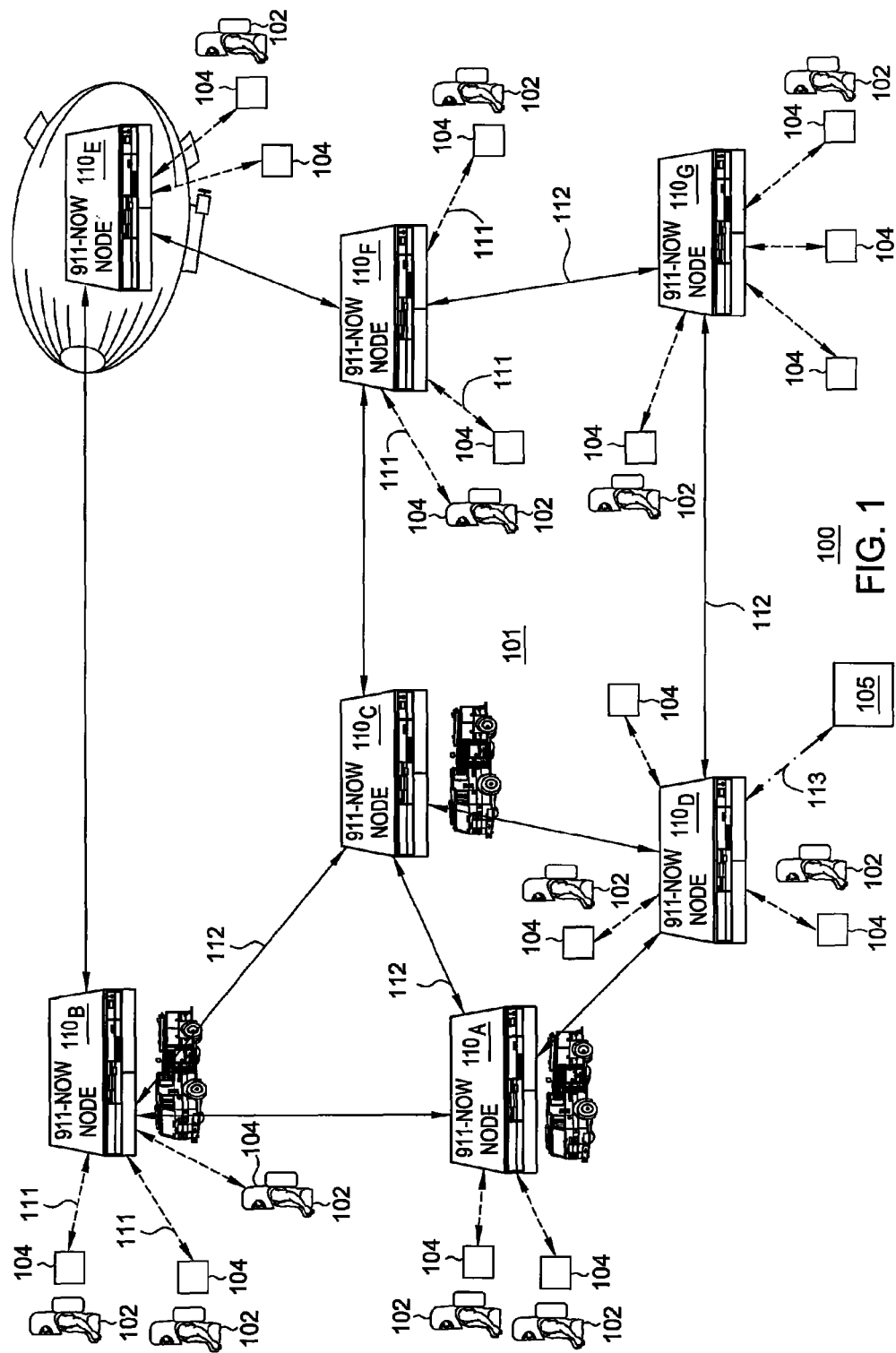
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes $110_A$-$110_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various services, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node 110$_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution-Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
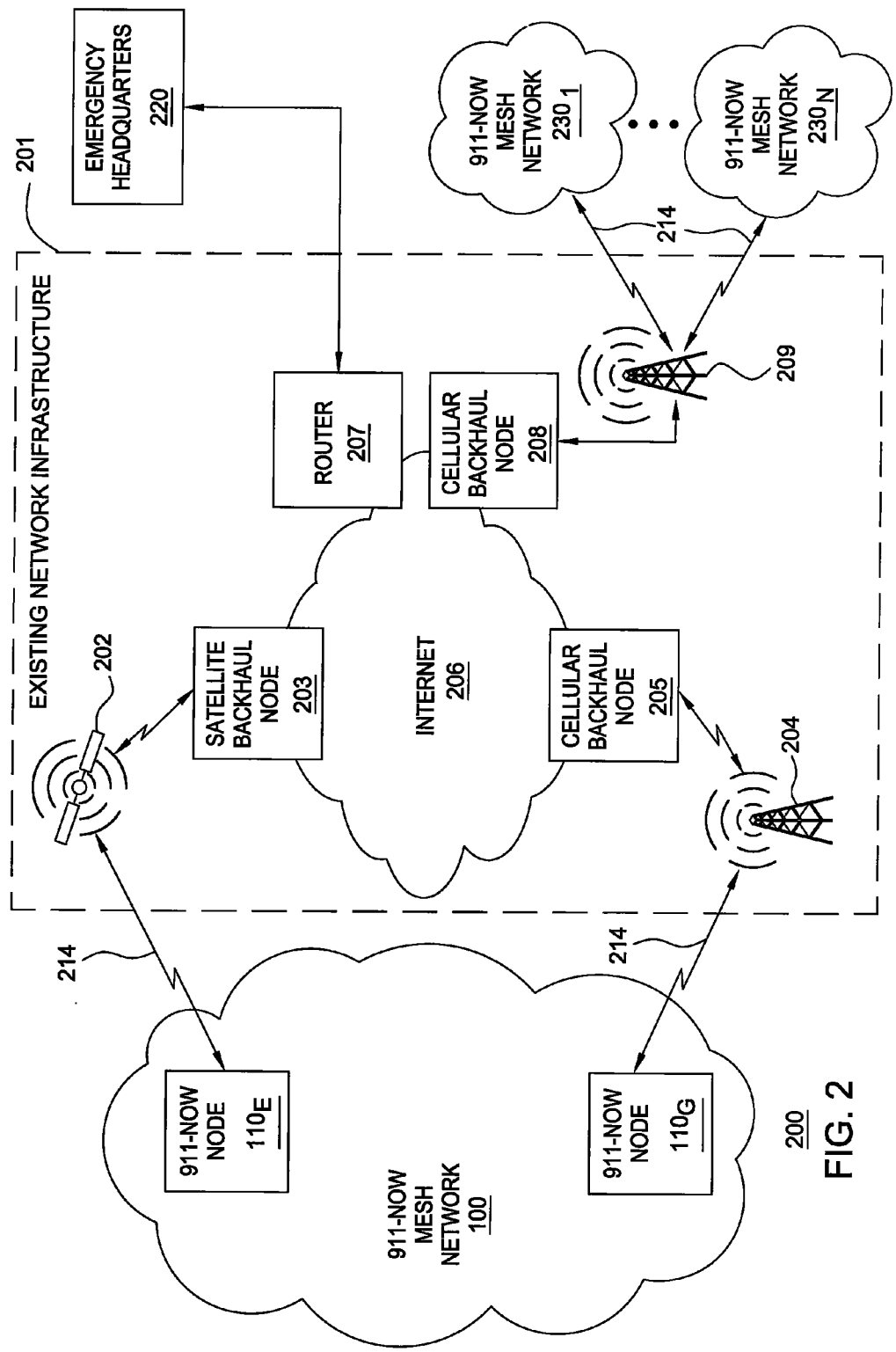
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node 110$_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node 110$_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
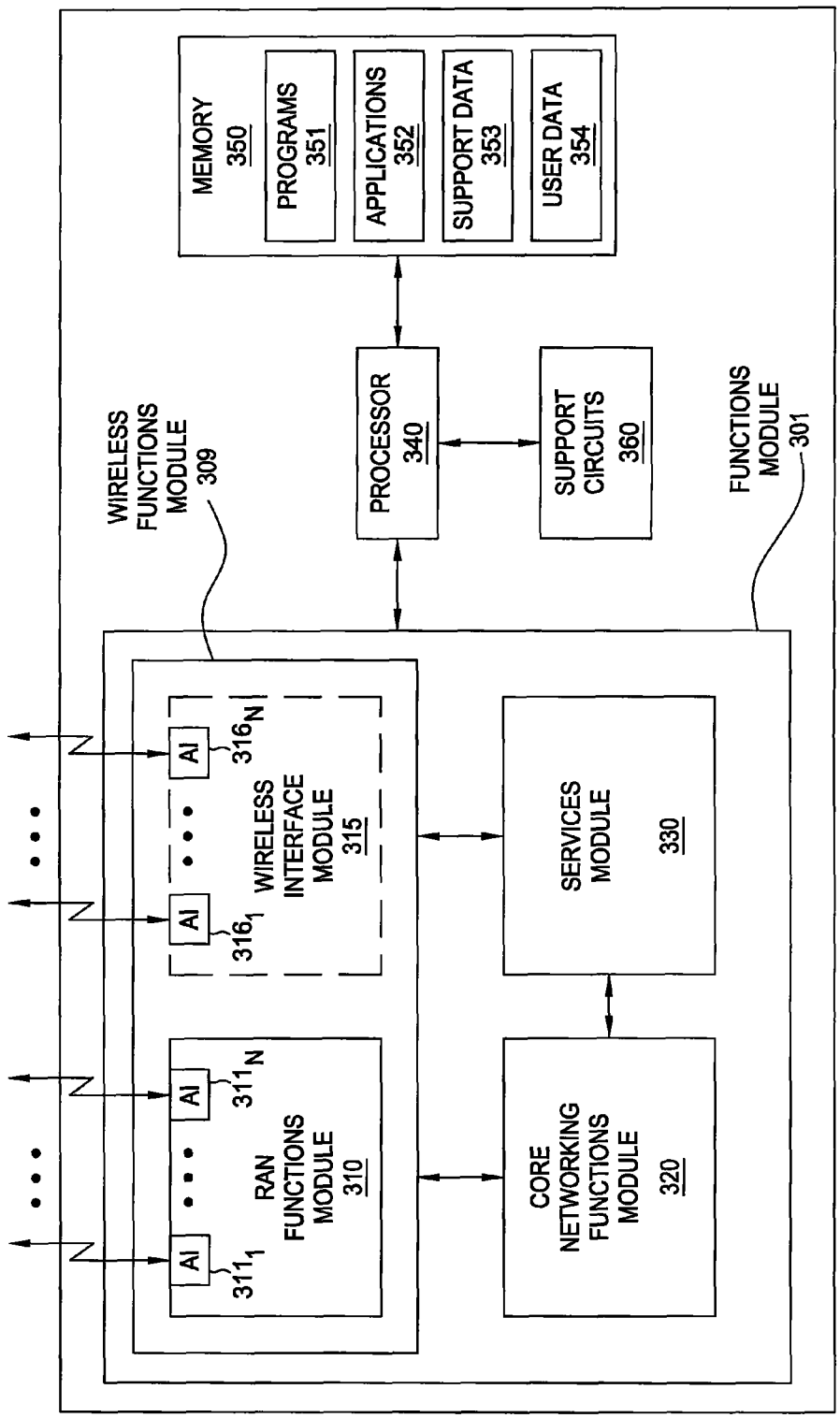
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

Figure 4:
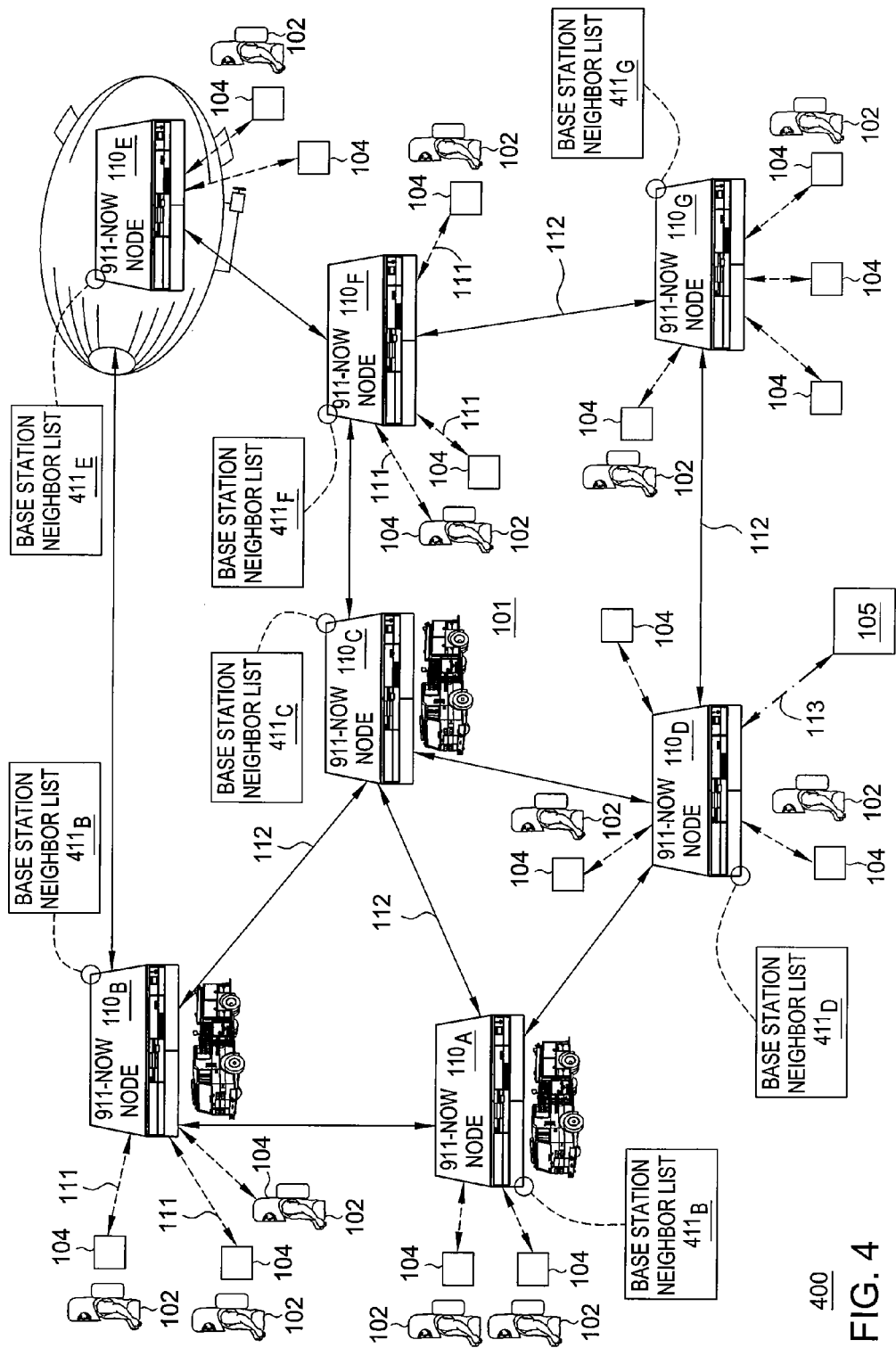
FIG. 4 depicts the 911-NOW communication network architecture of FIG. 1 in which 911-NOW nodes include respective base station neighbor lists.

FIG. 4 depicts the 911-NOW communication network architecture of FIG. 1 in which 911-NOW nodes include respective neighbor lists. As depicted in FIG. 4, 911-NOW nodes $110_A$-$110_G$ store respective base station neighbor lists $411_A$-$411_G$ (collectively, base station neighbor lists 411). Although primarily depicted and described within the context of a standalone wireless network (illustratively, standalone wireless network 100 of FIG. 1), the present invention may also be used in an integrated wireless network (e.g., such as the integrated wireless network of FIG. 2), or any wireless network using base stations. Thus, the present invention is primarily depicted and described herein within the context of a generic wireless network including base stations for which respective base station neighbor lists are dynamically created and updated.

A base station neighbor list stored at a base station includes a list of neighboring base stations which may be capable of accepting handoffs of wireless user devices from that base station. In one embodiment, the list of neighboring base stations included in a base station neighbor list may be prioritized. The base station neighbor list stored at a base station is distributed to wireless user devices served by that base station. The base station neighbor list stored at a base station is used by a wireless user device currently served by that base station to affect a handoff of the wireless user device from that base station to a neighboring base station (where the neighboring base station is selected by the wireless user device using the base station neighbor list).

Using the present invention, base station neighbor lists stored at respective base stations may be dynamically created and updated. The base station neighbor list stored at a base station is dynamically created and updated based on various combinations of information which may be obtained and analyzed in various different ways. The base station neighbor list for a base station may be determined for a number of different base station deployment scenarios. In describing base station neighbor list creation/update functions, the base station for which a base station neighbor list is being created may be referred to herein as a target base station and a base station being considered for inclusion in a base station neighbor list may be referred to herein as a candidate base station. The base station neighbor lists stored by base stations may be created and updated in a number of ways.

The base station neighbor lists for associated base stations may be created/updated using a central architecture, a distributed architecture, or a combination central-distributed architecture. In one embodiment, in which a central architecture is used, one system (e.g., one of the base stations adapted to function as a central controller, a management system, or some other system) may obtain information for creating/updating neighbor lists and distribute created/updated neighbor lists to associated base stations. In one embodiment, in which a distributed architecture is used, each base station may create/update its own base station neighbor list (e.g., using various combinations of information which may be obtained from a central system, from other base stations in the network, and the like, as well as various combinations thereof). Therefore, base station neighbor list creation/update functions of the present invention may be performed in a centralized and/or distributed manner.

Figure 5:
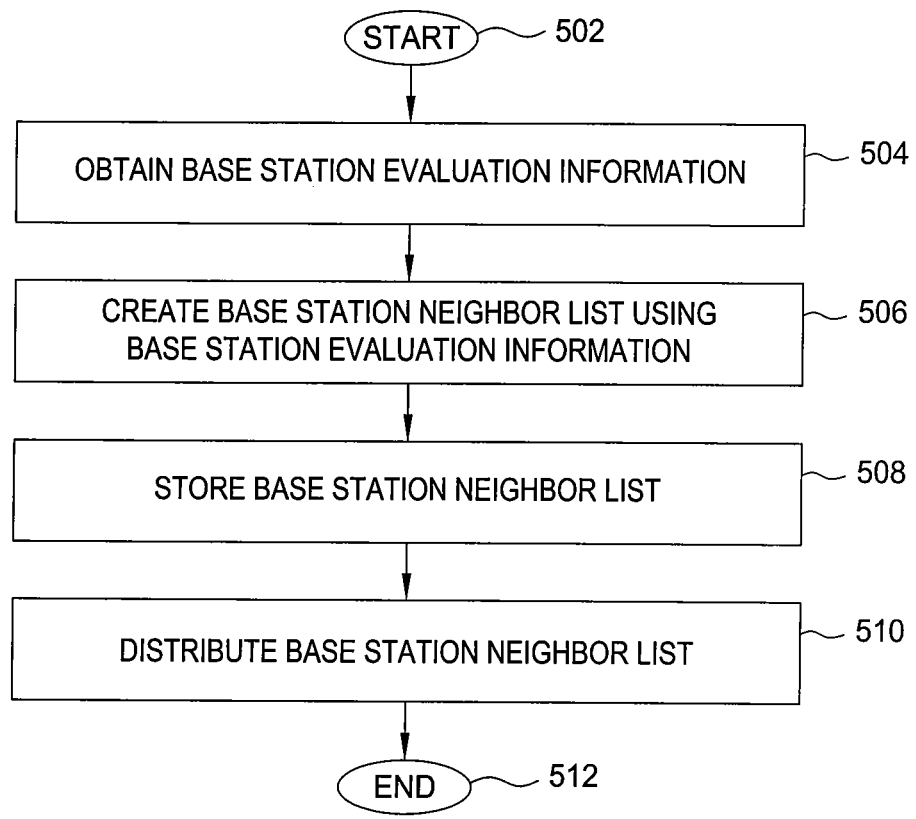
FIG. 5 depicts a method according to one embodiment of the present invention.

FIG. 5 depicts a method according to one embodiment of the present invention. Specifically, method 500 of FIG. 5 includes a method for creating a base station neighbor list. Although depicted and described with respect to one base station, a central controller may perform neighbor list creation process depicted and described with respect to method 500 of FIG. 5 for each base station in the network, or the each base station in the wireless network may perform the neighbor list creation process depicted and described with respect to method 500 of FIG. 5. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, information is obtained. The obtained information includes any information which may be used for creating and/or updating a base station neighbor list (which may include determining which base stations to include in the base station neighbor list and/or prioritizing base stations included in the base station neighbor list). The information may be obtained from various sources, e.g., the target base station for which the base station neighbor list is being created, one or more other base stations in the network, wireless user devices being served by the base station for which the base station neighbor list is being created, one or more management systems and/or databases, and the like, as well as various combinations thereof. The information may be obtained in any manner. The source(s) from which the information is obtained, and manner in which the information is obtained, may vary by the type of information obtained and, thus, may be better understood with respect to the descriptions of the different types of information obtained for use in creating and updating base station neighbor lists.

The information used to create and/or update a base station neighbor list may include information such as base station distance information, network status information, pilot signal strength measurement information, and the like, as well as various combinations thereof. The network status information may include network connectivity status information (e.g., existence of connections between base stations, quality of connections between base stations, and the like, as well as various combinations thereof), base station load information, and the like, as well as various combinations thereof. The pilot signal strength measurement information may include estimated model-based information (e.g., estimates of pilot signal strength measurements determined based on one or more models), measured feedback information (e.g., PCMD messages, PSMM messages, and like information fed back from wireless user devices), and the like, as well as various combinations thereof. The obtained information may include less or more information.

At step 506, a base station neighbor list is created using at least a portion of the obtained information.

As described herein, determining the base stations to be included in the base station neighbor list may be performed in a number of ways. In one embodiment, determining the base stations to include in the base station neighbor list may be performed by beginning with a full list of candidate base stations considered for inclusion in the base station neighbor list and successively filtering (i.e. pruning) base stations from the list of candidate base stations to arrive at a final base station neighbor list. In one embodiment, determining the base stations to include in the base station neighbor list may be performed by beginning with an empty list and successively adding candidate base stations to the list of included base stations to arrive at a final base station neighbor list.

As described herein, the base station filtering/selection functions and base station prioritization functions may be performed in any order, and the parameters used for performing the filtering/selection and prioritization functions may be applied in any order for performing those functions. Although, as described herein, determining the base stations to be included in the base station neighbor list may be performed in a number of ways, for purposes of clarity in describing the present invention, the present invention is primarily depicted and described herein with respect to embodiments in which a full list of base stations considered for inclusion in the base station neighbor list is successively filtered to create the final base station neighbor list.

In one embodiment, in which filtering is performed, the initial list of base stations considered for inclusion in the base station neighbor list may or may not be prioritized (or prioritization may be performed at any point during the filtering of the list of base stations considered for inclusion in the base station neighbor list). In one embodiment, the initial list of base stations considered for inclusion in the base station neighbor list is not prioritized before the list is filtered, such that the resulting base station neighbor list must then be prioritized using at least a portion of the parameters. In one embodiment, the initial list of base stations considered for inclusion in the base station neighbor list may be prioritized before the list is filtered, such that the resulting base station neighbor list is prioritized. Furthermore, the list of base stations considered for inclusion in the base station neighbor list may be prioritized at any point in the filtering/selection process.

At step 508, the base station neighbor list is stored at the associated base station for which the base station neighbor list is created (which may involve a central controller distributing the base station neighbor list to that base station where the base station neighbor list is not created by the target base station). At step 510, the base station neighbor list is distributed from the base station storing the base station neighbor list to each of the wireless user terminals currently being served by that base station. In one embodiment, the base station neighbor list may be distributed to wireless user devices using one or more downstream control channels. The wireless user terminals may then use the received base station neighbor list in order to make base station handoff decisions (i.e., in order to select one of the available base stations to which the wireless user device will switch to being served by).

At step 512, method 500 ends. Although depicted and described as ending, method 500 may be repeated. For example, method 500 may be performed periodically, in response to one or more detected conditions (e.g., a base station being decommissioned or deployed, a mobile base station changing location, changes in network conditions, and the like, as well as various combinations thereof). For purposes of clarity in describing the present invention, descriptions of the information which may be obtained for use in creating/updating a base station neighbor list, the manner in which the information may be obtained for use in creating/updating a base station neighbor list, the manner in which the obtained information may be evaluated for creating/updating a base station neighbor list, and like information, follow hereinbelow.

A base station neighbor list may be created and/or updated using base station distance information (i.e., using geographical distances between base stations, or some other measure indicative of the proximity of base stations to each other). In one embodiment, for a target base station for which a base station neighbor list is being created/updated, distances between the target base station and other base stations in the network may be determined for use in creating/updating the base station neighbor list for the target base station. For a target base station, the other base stations for which base stations distances are determined may include all of the base stations in the network or a subset of the base stations in the network (e.g., where the base station distance information is used to filter an existing list of candidate base stations considered for inclusion in the final base station neighbor list).

The geographic distances between a target base station and other base stations in the network may be used in order to select base stations for inclusion in a base station neighbor list or to filter base stations from inclusion in the base station neighbor list.

In one embodiment, in which an initial list of base stations considered for inclusion in the base station neighbor list is created based on base station geographic distance information, the geographic distance information is used to select base stations for inclusion in the initial base station neighbor list. For example, for a target base station, any base station within a threshold distance of the target base station may be selected for inclusion within an initial base station neighbor list.

In one embodiment, in which the initial list of base stations considered for inclusion in the base station neighbor list is created before evaluation of geographic location information is performed, the geographic location information may be used to filter the initial list of base stations considered for inclusion in the base station neighbor list. For example, all base stations in the network may be included in an initial list of base stations considered for inclusion in the base station neighbor list for a target base station, and any base station not within a threshold geographical distance of the target base station is filtered from the initial list of base stations considered for inclusion in the base station neighbor list.

The geographical distances between base stations may be obtained in any manner (e.g., retrieved from a central system or database, computed using the geographic locations of the base stations, and the like, as well as various combinations thereof). In one embodiment, in which geographical distances between base stations are determined using geographic locations of the base stations, the geographic locations of the base stations may be determined in any manner. In one such embodiment, geographic locations of base stations may be determined using GPS information associated with the base stations, respectively. In this embodiment, GPS information for base stations may be determined in any manner.

In one embodiment, in which a base station is equipped with a GPS receiver, the base station can determine its geographic location using received GPS signals. In another embodiment, in which a base station is not equipped with a GPS receiver, alternate triangulation techniques may be used in order to determine the geographic location of the base station (e.g., either by the base station itself, or by another device that determines the geographic location and propagates the geographic location to that base station). In another embodiment, in which a base station is not equipped with a GPS receiver, signal strengths of nearby commercial base stations may be used by the base station in place of geographic distances between base stations.

The use of geographic distances between base stations (or geographic locations of base stations which may be used to determine distances between base stations) to determine a base station neighbor list may be may be implemented using either a distributed approach or a centralized approach.

In a distributed approach, each base station may distribute its geographic location to other base stations, either periodically or in response to a change of its geographic location (e.g., if the base station moves by more than a threshold distance). In this approach, the base stations may distribute their respective geographic locations to any scope of other base stations (e.g., to one-hop neighbors, to two-hop neighbors, to all other base stations in the network, and the like). In one embodiment, a base station may distribute its geographic location to other base stations using a probing technique, whereby the base station uses probing to determine which other base stations are listening to that base station and sending its geographic location to those base stations. In this distributed approach, using its own geographic location, and geographic locations received from other base stations, a base station may then determine its geographically neighboring base stations.

In a centralized approach, each base station may report its geographic location to a central controller. A base station may report its geographic location periodically or in response to change in its geographic location (e.g., where the base station moves by more than a threshold distance). In this approach, using the geographic locations of the respective base stations, the central controller determines, for each base station, the geographically neighboring base station(s) for that base station. The central controller then distributes the geographic location information to the base stations for which the respective geographic location information was created.

The central controller may distribute geographic location information in a number of different formats. In one embodiment, for a given target base station, the central controller may distribute geographic locations of all other base stations in the network. In another embodiment, for a given target base station, the central controller may distribute geographic locations of other base stations within a threshold distance of that target base station. In another embodiment, for a given target base station, the central controller may distribute an initial list of base stations which may be considered for inclusion in the base station neighbor list such that the base station, upon receiving the initial list of possible base stations, may then perform additional processing to further refine the list of possible base stations using one or more other parameters.

A base station neighbor list may be created and/or updated using network status information. The network status information may be obtained from various sources in a number of different ways, which may depend on the information being collected. The information may be obtained from a central system(s) or database(s) storing network status information. The information may be obtained using various probing and/or monitoring techniques by which a target base station probes and/or monitors other base stations and/or connections with other base stations (or by which a central controller may obtain such information). The network status information may be obtained in various other ways. The network status information may include network connectivity status information, base station load information, and the like, as well as various combinations thereof.

The network connectivity status information may include any network connectivity status information. For example, for a target base station for which a base station neighbor list is being created, the network connectivity status information may include information identifying other base stations with which the target base station currently supports a connection (denoted as existing connection information), information indicative of the quality of existing connections between the given base station and other base stations with which the given base station currently supports a connection (denoted as connection quality information), and the like, as well as various combinations thereof. The network connectivity status information may include various other types of topology and/or connectivity related information.

The existing connection information includes information as to whether or not a connection currently exists between the target base station and any other base stations being considered for inclusion in the base station neighbor list. In one embodiment, if a connection does not exist between the target base station and a base station being considered for inclusion in the base station neighbor list, that base station that was previously being considered for inclusion in the base station neighbor list then may be excluded from the base station neighbor list (e.g., filtered from an initial list of base stations considered for inclusion). In one embodiment, if a connection exists between the given base station and a base station being considered for inclusion in the base station neighbor list, that base station may continue to be considered for inclusion in the base station neighbor list pending further evaluation of that connection using associated connection quality information. The existing connection information may include less or more information, and may be used in various other ways.

The connection quality information includes any information which may be used to assess the quality of a connection between base stations (e.g., mesh connections, backhaul connections, and the like, as well as various combinations thereof). For example the connection quality information for an existing connection may include one or more of connection capacity information, connection load information, connection delay information, connection error rate information, and the like, as well as various combinations thereof. The connection quality information may be evaluated in various ways (e.g., individually and/or collectively, using thresholds for inclusion/exclusion of base stations and/or relative ranking of base stations, and the like, as well as various combinations thereof). The connection quality information may include less or more information, and may be used in various other ways.

In one embodiment, for example, for a given connection between base stations, each connection quality parameter may be considered individually. For example, a connection capacity value below an associated threshold may result in filtering of the associated base station from the base station neighbor list, a connection load value above a threshold may result in filtering of the associated base station from the base station neighbor list, a connection delay value above a threshold may result in filtering of the associated base station from the base station neighbor list, and/or a connection error value above a threshold may result in filtering of the associated base station from the base station neighbor list. In some embodiments, similar evaluations using values and associated thresholds may be used to select base stations for inclusion in the base station neighbor list.

In one embodiment, for example, at least a portion of the connection quality parameters may be considered collectively. For example, where connection capacity, load, delay, and error parameter values are each evaluated for a given connection, the determination as to whether the associated base station is filtered for exclusion from (or selected for inclusion in) the base station neighbor list may be performed based on the number of these parameters for which associated thresholds are satisfied (or not satisfied). For example, for a given base station, as long as at least three of those four parameters have desirable values (e.g., values satisfying associated thresholds), that base station may continue to be included in the base station neighbor list, but when two or more of the four parameters have undesirable values that base station may be filtered from the initial list of base stations considered for inclusion in the base station neighbor list. The information may be evaluated in various other ways.

In one embodiment, the network connectivity status information may further include information indicative of the compatibility of the target base station to communicate with the other base stations being considered for inclusion in the base station neighbor list (denoted as network connectivity complexity information). For example, for each combination of the target base station and the base station being considered for inclusion in the base station neighbor list, network connectivity complexity information may include information such as the type of wireless technology supported by each of the base stations, carrier frequencies supported by each of the base stations, and like information which may be used to evaluate the level of complexity required to support communications between the target base station and other base stations being considered for inclusion in the base station neighbor list.

The base station load information may be used to determine which base stations should be included in the base station neighbor list. The base station load information may be considered before or after the connectivity status information. The base station load information includes information indicative of the level of load currently being supported by a base station being considered for inclusion in the base station neighbor list (e.g., in terms of the number of wireless user devices currently being supported by that base station). As with other parameters, the base station load information may be evaluated in a number of different ways (e.g., for use in ranking base stations being considered for inclusion within the base station neighbor list by their respective loads, with respect to thresholds in order to filter any base stations with undesirable load values, and the like, as well as various combinations thereof).

A base station neighbor list may be created and/or updated using pilot signal strength measurement information. The pilot signal strength measurement information may include pilot signal strength measurement estimates. In one embodiment, pilot signal strength measurement estimates may be determined based on one or more models. For example, pilot signal strength measurement estimates may be determined using one or more path loss models (which may also be referred to as propagation models). The pilot signal strength measurement information may include pilot signal strength measurement feedback information (i.e., values fed back from wireless user terminals to base stations). For example, pilot signal strength measurement feedback may include per-call measurement data (PCMD) messages, pilot signal strength measurement metric (PSMM) messages, and the like, as well as various combinations thereof.

The pilot signal strength measurement feedback information includes any information fed back from wireless user devices to base stations that specifies the strength of pilot signals received by the wireless user devices from base stations. In one embodiment, pilot signal strength measurement feedback information may be received as pilot signal-to-interference-and-noise (SINR, Ec/Io) information. In one embodiment, a wireless user device provides pilot signal strength measurement feedback information for pilot signals received from base stations included in a base station neighbor list distributed to the wireless user device. As such, in one embodiment, multiple different base station neighbor lists (which may include different combinations of base stations) may be provided to wireless user terminals in order to increase the number of base stations from which pilot signal strength measurement feedback information is received.

In one embodiment, pilot signal strength measurement feedback information may be obtained from PCMD messages received at a base station from wireless user devices served by that base station. A PCMD message received from a wireless user device includes for each base station from which that wireless user device receives a pilot signal, a measure of the strength of that received pilot signal. In one embodiment, the pilot signal strength measurement feedback information may be obtained from PSMM messages received at a base station from wireless user devices served by that base station. A PSMM message received from a wireless user device includes, for each base station from which that wireless user device receives a pilot signal, a measure of the strength of that received pilot signal. The pilot signal strength measurement feedback information may be obtained from types of feedback messages.

The base station receiving PSMM metrics (e.g., in PCMD messages, PSMM message, and like feedback messages) can process the PSMM metrics to determine information useful in determining which base stations should be included in the base station neighbor list, as well as for prioritizing base stations included in the base station neighbor list.

In one embodiment, the base station can use the PSMM metrics in order to determine the base station(s) from which each wireless user device currently receives the strongest pilot signal (and, thus, the base station(s) most likely to be able to provide the best service to the wireless user device if the wireless user device requests a handoff). In one embodiment, the target base station for which the base station neighbor list is being created can use the PSMM metrics in order to determine, for each base station considered for inclusion in the base station neighbor list, the number of wireless user devices which received a pilot signal from that base station. In some embodiments, a combination of such information, as well as other information, may be determined from PSMM metrics for use in creating/updating the base station neighbor list.

As described herein, the base station neighbor list may be created by evaluating different combinations of parameters in a variety of different ways. For example, filtering/selection of base stations to create/update the base station neighbor list may be performed in a manner that does not attempt to ensure that the resulting base station neighbor list includes a predetermined number of base stations or, alternatively, in a manner that does attempt to ensure that the resulting base station neighbor list includes a predetermined number of base stations (where there may be a limit on the size of the base station neighbor list). For example, the parameters may be evaluated using automatic base station filtering/selection techniques, score-based base station filtering/selection techniques, and the like, as well as various combinations thereof.

In one embodiment, selection/filtering of base stations for the base station neighbor list may be performed in a manner that does not attempt to ensure that the resulting base station neighbor list includes a predetermined number of base stations. In one such embodiment, at least a portion of the parameters/information may be evaluated for each base station individually (and filtering/selection decisions may be made based on evaluations of individual parameters. For example, if a value of a parameter is undesirable (e.g., based on a comparison with an associated threshold), the associated base station may be automatically filtered from the base station neighbor list irrespective of any consideration for the ultimate size of the finalized base station neighbor list. This type of filtering/selection ensures that only base stations having desirable values of evaluated parameters will remain in the final base station neighbor list.

In one embodiment, selection/filtering of base stations for the base station neighbor list may be performed in a manner that attempts to ensure that the resulting base station neighbor list includes a predetermined number of base stations. In one such embodiment, at least a portion of the parameters/information may be evaluated for each base station relative to every other base station in order to filter the initial list of base stations considered for inclusion in the base station neighbor list to the predetermined number of base stations (since evaluation of base stations individually, based solely on evaluating parameters with respect to thresholds, may result in a base station neighbor list that is: (1) too large to support efficient handoffs of wireless user devices, or (2) too small to support any handoffs of wireless user devices).

In one embodiment, for example, rather than automatically excluding a base station from the base station neighbor list because one value of one parameter is undesirable (e.g., if the value of the parameter fails to satisfy an associated threshold), values of that parameter for all respective base stations may be ranked so that a specific number of base stations (i.e., the base station(s) having the most undesirable value(s) for that parameter) may be filtered from the base station neighbor list. For example, connection delay values may be obtained for each of the base stations being considered for inclusion in the base station neighbor list, the base stations may be ranked according to the connection delay values, and a given number of the base stations having the worst connection delay values may then be filtered from the consideration for inclusion in the final base station neighbor list.

In one embodiment, multiple parameters may be evaluated collectively for each base station so that base station(s) having the most undesirable combination of values for the respective parameters under evaluation may be filtered from the final base station neighbor list.

In one embodiment, different parameters evaluated for each base station may be ranked according to their respective importance (e.g., the existence of connectivity is most important, base station load is next most important, connection load is next most important, and so on). In this embodiment, the relative importance of the different parameters being evaluated is accounted for in determining which base station(s) should be filtered from inclusion in the base station neighbor list. In a simple example, where connection load is more important than base station load, and where first and second base stations being compared have connection load values of 30% and 35% and base station load values of 40% and 35%, respectively, the second base station will be preferred over the first base station for inclusion in the base station neighbor list (since it has a higher value of the more important parameter and there is not a large difference between values of the less important parameter).

In one embodiment, the different parameters evaluated for each base station may be assigned respective weights according to their respective importance. In one example, connection capacity is weighted 25%, base station load is weighted 15%, connection load is weighted 20%, connection error is weighted 10%, and various other parameters make up the other 30%. In another example, base station load is weighted 20%, connection capacity is weighted 15%, connection load is weighted 15%, base station load is weighted 15%, connection delay is weighted 15%, connection error is weighted 10%, and various other parameters make up the other 10%. Any other combination of parameters and associated weights may be used.

In one embodiment, a weighted score is computed for each base station being considered for inclusion in the base station neighbor list. For a given base station, the weighted score is computed using the values of the respective parameters for that base station, as well as the weights assigned to the respective parameters. In this embodiment, the base stations may then be filtered from (or selected for inclusion in) the base station neighbor list according to the computed scores. The weighted scores computed for base stations may be computed using weights assigned to specific parameters, weights assigned to categories or groups of parameters (e.g., assigning weights to connectivity status information, base station load, and the like), and the like, as well as various combinations thereof.

In one embodiment, a combination of such evaluation techniques may be used (e.g., using a combination of automatic filtering for some parameters and ranking-based and/or score-based filtering for other parameters). For example, for a given base station for which the base station neighbor list is being created, any base station in the geographic proximity of the given base station may be automatically filtered from the base station neighbor list if connectivity cannot be established between the given base station and that base station being evaluated. In this example, any remaining base stations for which connectivity can be established may then be further evaluated by computing weighted scores for the remaining base stations (computed based on various other parameters), ranking the weighted scores, and filtering at least a portion of the base stations based on the weighted scores.

Although primarily depicted and described herein as using such parameters for filtering/selection of base stations for determining which base stations are included in the base station neighbor list, at least some of the described parameters may also be used for prioritizing base stations in the base station neighbor list. In one embodiment, for example, at least a portion of the described parameters may be used to prioritize base stations in an intermediate list being filtered to obtain the final list of base stations included in the base station neighbor list. In one embodiment, for example, at least a portion of the described parameters may be used to prioritize final list of base stations included in the base station neighbor list (e.g., where prioritization is performed after the determination as to which base stations are included is complete). The prioritization of base stations in the base station neighbor list is described in more detail with respect to FIG. 6.

Although primarily depicted and described herein with respect to embodiments in which base stations included in a base station neighbor list are prioritized following completion of the final base station neighbor list, base station filtering/selection functions and base station prioritization functions may be performed in any order. In one embodiment, for example, an initial list of base stations considered for inclusion in the base station neighbor list may be prioritized prior to filtering of the initial list to create the final base station neighbor list. In another embodiment, for example, an initial list of base stations considered for inclusion in the base station neighbor list may be filtered to form an intermediate list of base stations considered for inclusion in the base station neighbor list, the base stations in the intermediate list may then be prioritized, and then additional filtering may be performed on the intermediate list following completion of the prioritization function.

In other words, in some embodiments, for example, successive rounds of filtering and prioritization may be performed. For example, an initial list of base stations considered for inclusion in the base station neighbor list may be partially filtered using a portion of the available parameters/information. In this example, the partially filtered list may then be prioritized using a portion of the parameters/information. The prioritized version of the partially filtered list may then be further filtered based on other available parameters/information. In other words, in different embodiments of the present invention, any number of filtering and/or prioritization operations may be performed, in any order, or even collectively (e.g., where prioritization is used to perform filtering), to create the base station neighbor list.

Although depicted and described with respect to evaluating specific parameters/information, fewer or more parameters/information may be evaluated for creating/prioritizing base station neighbor lists. Although depicted and described with respect to evaluating parameters/information in a specific order, parameters/information may be evaluated in various other orders for creating/prioritizing base station neighbor lists. Although depicted and described with respect to evaluating parameters/information in a particular manner (e.g., using thresholds, individually versus collectively, using scores and/or weighted scores, and the like, as well as various combinations thereof), parameters/information may be evaluated in various other ways for creating/prioritizing base station neighbor lists.

The information that is available for use in creating/updating a base station neighbor list for a base station may depend on the deployment scenario in which the base station neighbor list is being created/updated and, therefore, the information used to create/update a base station neighbor list for a base station may depend on deployment scenario in which the base station neighbor list is being created/updated. For example, deployment scenarios may include greenfield deployment scenarios (e.g., deployment of a network of one or more base stations in a new location), overlay deployment scenarios (e.g., deployment of newer technology in an area in which older technology is currently deployed), network enhancement scenarios (e.g., modification of one or more existing base stations (e.g., modifying antenna settings, power settings, and the like), addition of one or more base stations to an existing network for improved capacity and/or coverage, and the like).

In one embodiment of a greenfield deployment scenario, in which RF data is not available a priori, an initial base station neighbor list may be created using non-feedback information such as base station distance information, propagation modeling (i.e., using one or more path loss models), and like information that is not obtained from feedback from wireless user terminals but which is available in the greenfield deployment scenario. The initial base station neighbor list may then be refined using feedback information obtained from wireless user devices (e.g., using PSMM metric information received from wireless user devices) to create a final base station neighbor list which may then be updated, as needed, using feedback information.

In one embodiment of an overlay deployment scenario, in which base station neighbor lists already exist in the existing base stations, the existing base station neighbor lists may be obtained by the new base station(s) being deployed. For example, the existing base station neighbor lists may be retrieved from the existing base stations or from a management system. In such embodiments, the new base stations may be co-located with existing base stations (e.g., to update the wireless capabilities for the locations covered by that base station) or deployed in new locations.

In one embodiment, in which an existing base station and a new base station are co-located, the base station neighbor list of the existing base station may be selected as an initial base station neighbor list for the new base station being deployed. In one embodiment, in which a new base station is not co-located with any existing base stations, one of the existing base station neighbor lists may be selected as an initial base station neighbor list for the new base station being deployed. In some such embodiments, one or more other base station neighbor lists from one or more other existing base stations may be selected for use in determining the initial base station neighbor list for the new base station being deployed (i.e., multiple existing base station neighbor lists are selected for use in determining the initial base station neighbor list).

In such embodiments, the existing base station neighbor lists(s) selected as the initial base station neighbor list (or, where multiple lists are selected, for use in determining the initial base station neighbor list) may be selected based on the geographic location of the new base station with respect to geographic locations of the existing base stations. For example, the existing base station neighbor list(s) may be the base station neighbor list(s) from the closest existing base station(s). The existing base station neighbor lists(s) selected as the initial base station neighbor list (or, where multiple lists are selected, for use in determining the initial base station neighbor list) may be selected based on other non-feedback information.

In such embodiments in which multiple existing base station neighbor lists from multiple base stations are used for determining an initial base station neighbor list for a new base station, the existing base station neighbor lists selected for use in determining the initial base station neighbor list may be evaluated in order to select one of the existing base station neighbor lists as the initial base station neighbor list for a target base station, or to select base stations from different ones of the existing base station neighbor lists to form an initial base station neighbor list for the target base station.

In such embodiments, the initial base station neighbor list may then be refined to create a final base station neighbor list, which may then be updated, as needed, using various combinations of information. For example, the final base station neighbor list may be created and updated using various combinations of non-feedback information (e.g., network status information, one or more propagation models, and the like) and/or feedback information obtained from wireless user devices (e.g., using PSMM metric information received at the base station from wireless user devices) to create a final base station neighbor list which may then be updated, as needed, using feedback information.

In different embodiments of network enhancement scenarios, different combinations of information may be used for creating and updating base station neighbor lists for existing base stations and/or new base stations. For example, the information may include existing base station neighbor lists from one or more existing base stations, base station distance information, network status information, one or more propagation models, feedback information, and the like, as well as various combinations thereof. In such embodiments, the base station neighbor lists may be created and updated in different ways dependent on different factors (e.g., depending on the information that is available, the base station neighbor list creation/update algorithm that is employed, and the like, as well as various combinations thereof).

As described herein, the present invention supports dynamic creation and updating of base station neighbor lists under various conditions. The present invention supports dynamic creation and updating of base station neighbor lists in different deployment scenarios. The present invention supports dynamic creation and updating of base station neighbor lists using different combinations of information. The present invention supports dynamic creation and updating of base station neighbor lists using different evaluation techniques (e.g., using one or more initial base station neighbor lists to create a final base station neighbor list). Therefore, the present invention supports dynamic creation and updating of base station neighbor lists using different base station neighbor list configuration algorithms adapted for dynamically creating and/or updating base station neighbor lists.

As described herein, base station neighbor list configuration algorithms may include: an algorithm using distance between base stations, an algorithm using network status information, an algorithm using estimates of pilot signal strength measurements (e.g., using one or more propagation models), an algorithm using feedback of pilot signal strength measurements, and the like, as well as various combinations thereof. Further, as described herein, the base station neighbor list configuration algorithms may include algorithms using combinations of such information, in any order, for any purpose (e.g., for selection of base stations, filtering of base stations, prioritization of base stations, and like functions). A method according to one embodiment using a combination of such information is depicted and described with respect to FIG. 6.

Figure 6:
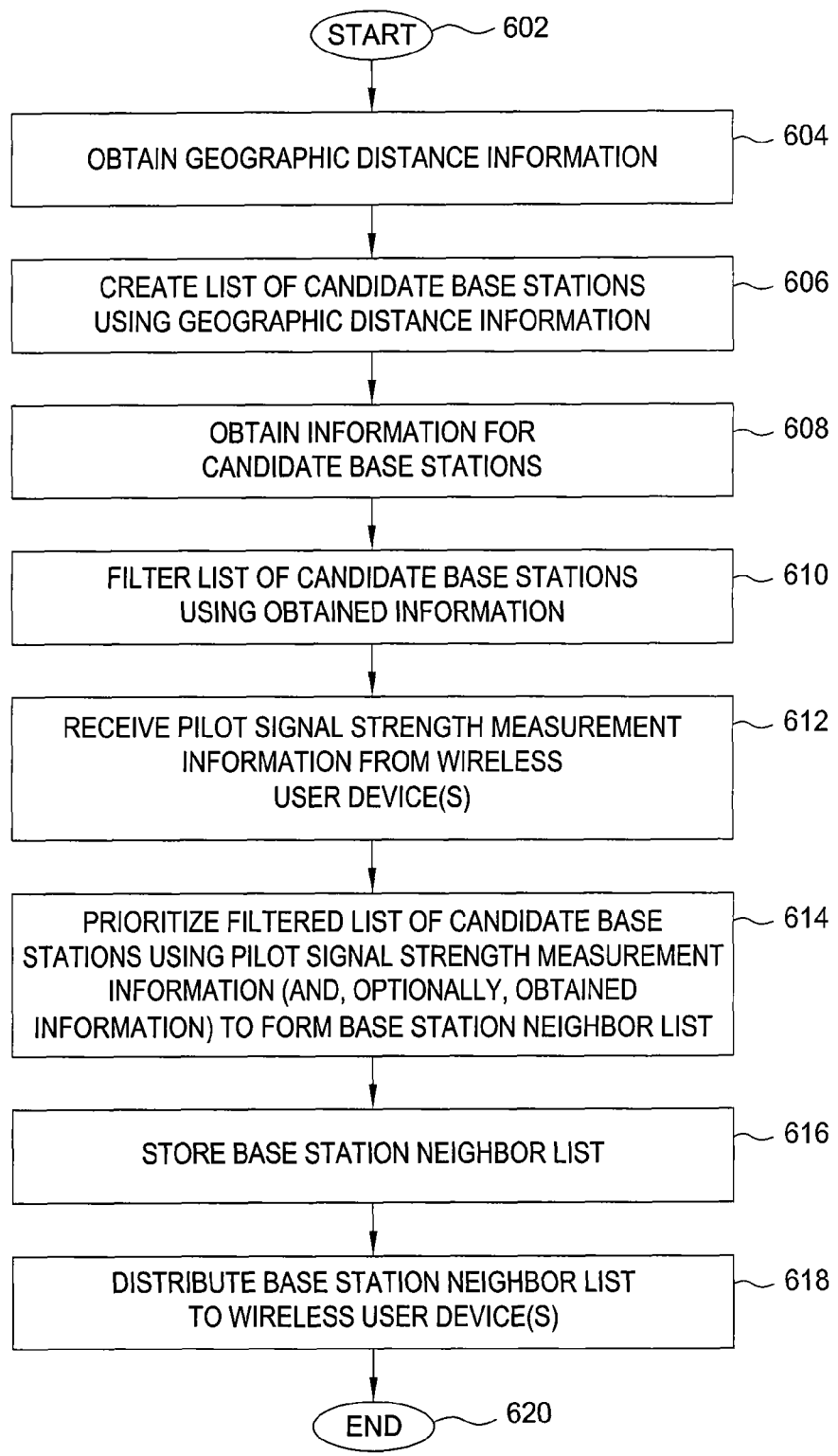
FIG. 6 depicts a method according to one embodiment of the present invention.

FIG. 6 depicts a method according to one embodiment of the present invention. Specifically, method 600 of FIG. 6 includes a method for creating a base station neighbor list. Although depicted and described with respect to evaluating specific information (for specific purposes in a specific order), this example merely constitutes one embodiment of a base station neighbor list configuration algorithm. Although depicted and described with respect to one base station (denoted as the target base station for which the base station neighbor list is being created), each base station may perform the base station neighbor list update process of FIG. 6.

Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, the target base station obtains geographic distance information for at least some of the base stations in the network. The geographic distance information for a base station is a measure of the geographic distance between that base station and target base station. The target base station may retrieve geographic distance information for other base stations (e.g., from a management system or central database) and/or may compute geographic distance information for other base stations using geographic location information for the other base stations (e.g., which may be retrieved from a management system or database and/or received from the other base stations).

At step 606, the target base station creates a list of candidate base stations considered for inclusion in the base station neighbor list. The target base station creates the list of candidate base stations using the geographic distance information. Although described with respect to an embodiment in which the base station creates an initial list of candidate base stations using geographic distance information (e.g., selecting a subset of the base stations in the network for inclusion in the list of candidate base stations), in one embodiment an initial list of candidate base stations may already exist (e.g., including all base stations in the network, or a subset of the base stations in the network), in which case the target base station may filter the initial list of candidate base stations using the geographic distance information.

At step 608, for each base station in the list of candidate base stations, the target base station obtains information adapted for use in filtering the list of candidate base stations. For example, the information may include network status information, estimated pilot signal strength measurement information (e.g., estimated based on one or more path loss models), and the like, as well as various combinations thereof. For a given candidate base station, the information may be obtained in a number of ways (e.g., the candidate base station may transmit the value to the target base station, the target base station may perform some monitoring and/or probing functions to obtain the value of the parameter, and the like, as well as various combinations thereof).

At step 610, the target base station filters the list of candidate base stations considered for inclusion in the base station neighbor list to form a filtered list of candidate base stations. The target base station filters candidate base stations from the initial list of candidate base stations based on the information obtained for each candidate base station included in the list of candidate base stations. As depicted and described herein with respect to FIG. 5, the evaluation of the information for filtering the list of candidate base stations may be performed in various different ways (e.g., using thresholds, using ranking/weighting of different types of information, using different combinations of information, and the like, as well as various combinations thereof).

At step 612, the target base station receives actual pilot signal strength measurement information (e.g., PCMD messages, PSMM message, and the like) from each of the wireless user devices currently served by the target base station. At step 614, the target base station prioritizes the base stations included in the filtered list of candidate base stations, forming the base station neighbor list. The target base station prioritizes the base stations included in the filtered list of candidate base stations using the pilot signal strength measurement information (and, optionally, using at least a portion of the parameters depicted and described herein as being used for determining which base stations to include in the base station neighbor list, i.e., using at least a portion of the information obtained in step 608).

In one embodiment, the base station can use the PSMM metrics in order to determine the base station(s) from which each wireless user device currently receives the strongest pilot signal (and, thus, the base station(s) most likely to be able to provide the best service to the wireless user device if the wireless user device requests a handoff). In one embodiment, the base station for which the base station neighbor list is being created can use the PSMM metrics in order to determine, for each base station considered for inclusion in the base station neighbor list, the number of wireless user devices which received a pilot signal from that base station. In some embodiments, a combination of such information, as well as other information, may be determined from PSMM metrics and used to create/update the base station neighbor list.

For example, assume that a base station for which a base station neighbor list is being created filters a list of base stations in geographic proximity to that base station (e.g., from five total base stations denoted as BS1, BS2, BS3, BS4, and BS5 to three base stations, namely, BS2, BS3, and BS5). In this example, further assume that the base station for which the base station neighbor list is being created currently supports four wireless user devices (denoted as WUD1, WUD2, WUD3, and WUD4). In this example, assume that the base station for which the base station neighbor list is being created receives PSMM messages from the four wireless user devices which include the following pilot signal strength measurements (among others from other base stations already excluded from inclusion in the base station neighbor list,): WUD1 [BS1: 0.3; BS2: 0.9; BS3: 0.7], WUD2 [BS3: 0.8; BS4: 0.1, BS5: 0.2], WUD3 [BS1: 0.5; BS3: 0.8; BS4: 0.2, BS5: 0.3], and WUD4 [BS2: 0.8, BS3: 0.7, BS4: 0.4].

In this example, using the sample PSMM messages, the base station may prioritize the base stations BS2, BS3, and BS5 in the base station neighbor list as (from most to least important): BS3, BS2, BS5. This priority may be determined based on the fact that all four of the wireless user devices are within range of BS3 and receive relatively strong pilot signals from that base station (strengths of 0.7, 0.8, 0.8, and 0.7, respectively). Then, in determining whether BS2 or BS5 has a higher priority, it is noted that two wireless user devices received pilot signals from BS2 (WUD1 and WUD4 received metrics of 0.8 and 0.9) and two wireless user devices received pilot signals from BS5 (WUD2 and WUD3 received metrics of 0.2 and 0.3). Therefore, since BS2 provides higher pilot signal strengths than BS5 (for an equal number of wireless user devices), BS2 is given higher priority than BS5.

Although this example seems to give priority to the number of WUDs receiving pilot signals from a base station (as opposed to the strength of the received pilot signals), either factor may be given priority over the other factor, or the factors may be weighted equally and used in combination with each other as necessary, and, further, these factors may be used individually or in combination with various other factors. In one embodiment, for example, average pilot signal strength values may be computed for each base station being prioritized. In one such embodiment, for each base station, the pilot signal strengths received by wireless user devices from that base station may be summed, and that total is then divided by the number of wireless user devices that received a pilot signal from that base station. The prioritization of base stations in a base station neighbor list may be performed by processing PSMM metric information in various other ways.

At step 616, the target base station stores the base station neighbor list. At step 618, the target base station distributes the base station neighbor list to wireless user devices currently being served by the target base station. In one embodiment, the base station neighbor list may be distributed to wireless user devices using one or more downstream control channels. The wireless user terminals may then use the received base station neighbor list in order to make base station handoff decisions (i.e., in order to select one of the available base stations to which the wireless user device will switch to being served by). At step 620, method 600 ends.

As described herein, base station neighbor lists may be created and updated in many different ways. In one embodiment, a base station neighbor list may be created and updated by creating one or more initial base station neighbor lists, evaluating the initial base station neighbor list(s) to create a final base station neighbor list, and continuing to evaluate the final base station neighbor list in order to maintain an optimum base station neighbor list for the target base station. In one embodiment, the one or more initial base station neighbor lists may be created and refined using non-feedback information (e.g., geographic distances, network status information, path loss models, and the like) and the final base station neighbor list may be created and refined by evaluating the one or more initial base station neighbor lists using pilot feedback information (e.g., using actual pilot signal strength measurement information). A method according to one such embodiment is depicted and described herein with respect to FIG. 7.

Figure 7:
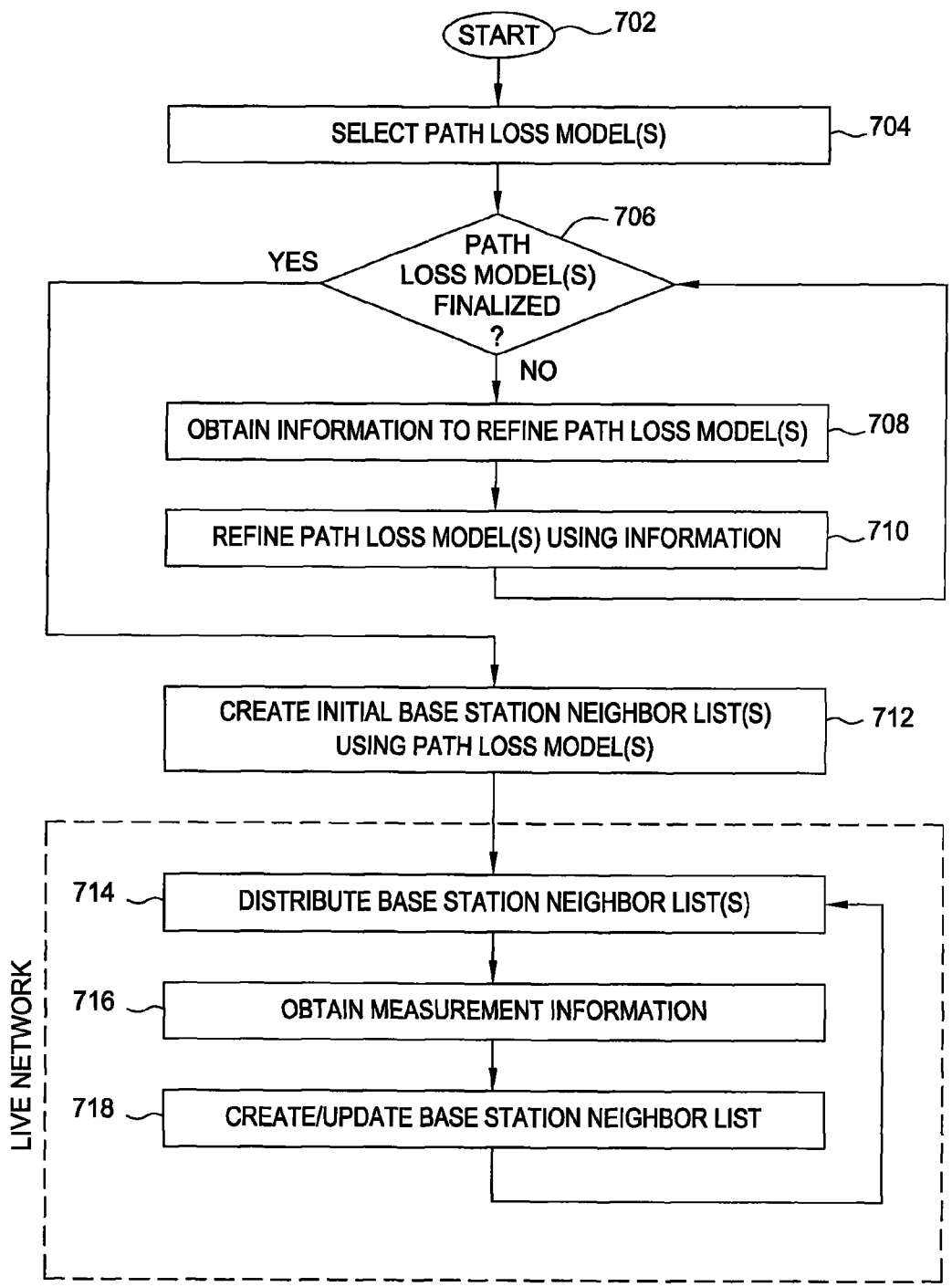
FIG. 7 depicts a method according to one embodiment of the present invention.

FIG. 7 depicts a method according to one embodiment of the present invention. Specifically, method 700 of FIG. 7 includes a method for creating and updating a base station neighbor list using pilot signal strength measurement information (including estimated and actual pilot signal strength measurement information). Although depicted and described with respect to one base station (denoted as the target base station for which the base station neighbor list is being created), each base station may perform the base station neighbor list update process of FIG. 7. Although depicted and described as being performed serially, at least a portion of the steps of method 700 of FIG. 7 may be performed contemporaneously, or in a different order than depicted and described with respect to FIG. 7. The method 700 begins at step 702 and proceeds to step 704.

At step 704, a path loss model is selected. The path loss model may be used to produce estimated pilot signal strength measurements, which may be processed to create one or more base station neighbor lists. In one embodiment, the path loss model(s) may be used to produce estimated pilot signal strength measurements which may be processed to create a final base station neighbor list (which may be further refined using actual pilot signal strength measurements (i.e., feedback information). In one embodiment, the path loss model(s) may be used to produce estimated pilot signal strength measurements which may be processed to create one or more initial base station neighbor lists, which may be further evaluated using actual pilot signal strength measurements (i.e., feedback information) to produce a final base station neighbor list.

The path loss model may be selected based on characteristics of the wireless network. For example, the path loss model may be selected based on one or more characteristics of the region in which the wireless network is deployed (e.g., whether the wireless network is deployed in a rural, suburban, or urban region; characteristics of the terrain in the region in which the wireless network is deployed, such as whether the terrain is mountainous, foliage patterns, and the like; atmospheric conditions, and the like, as well as various combinations thereof). For example, the path loss model may be selected based on one or more characteristics of the type of wireless network (e.g., the type of cellular technology supported). The path loss model may be selected based on various other factors. In one embodiment, multiple path loss models may be selected (e.g., for use in creating multiple initial base station neighbor lists which may be evaluated using measurement information).

At step 706, a determination is made as to whether the selected path loss model(s) is finalized. In one embodiment, the originally selected path loss model may be adequate for use in creating one or more base station neighbor lists; however, depending on how well the selected path loss model(s) correspond to the various characteristics associated with the wireless network, one or more of the selected path loss models may be refined before any base station neighbor lists are generated. If the selected path loss model(s) is finalized, method 700 proceeds to step 712, where one or more base station neighbor lists are generated using the finalized path loss model(s). If the selected path loss model(s) is not finalized, method 700 proceeds through steps 708 and 710 in order to refine the path loss model(s).

At step 708, information adapted for use in refining one or more path loss models is obtained. In one embodiment, the information includes non-feedback information (i.e., information other than information fed back from the wireless user devices is used until feedback information can be obtained from wireless user devices and evaluated). The information may include network status information. The information may include measurements adapted for use in refining path loss models (e.g., measurements taken by receivers installed near the base stations that are propagated to other base stations, drive test measurements, measurements taken by engineers in the field, and the like, as well as various combinations thereof.

At step 710, the path loss model(s) is refined using the obtained information. The path loss model may be refined in any manner for refining path loss models. In one embodiment (omitted for purposes of clarity), one or more of the previously selected path loss models may be deselected based on the obtained information (e.g., if the obtained information indicates that the originally selected path loss model does not provide a good model for the network) and/or one or more other path loss models that were not previously selected may be selected based on the obtained information (e.g., if the obtained information indicates that the path loss model provides a good model for the network). From step 710, method 700 returns to step 706, at which point another determination is made as to whether or not the path loss model(s) is finalized (e.g., for purposes of creating one or more initial base station neighbor lists or creating a final base station neighbor list).

At step 712, one or more initial base station neighbor lists is created using the finalized path loss model(s). In one embodiment, each initial base station neighbor list is created by obtaining estimated pilot signal strength measurements based on the finalized path loss model(s) and processing the obtained estimated pilot signal strength measurements to create the initial base station neighbor list. In one such embodiment, processing of estimated pilot signal strength measurements to create the initial base station neighbor list may be performed in a manner as depicted and described herein with respect to FIG. 9.

Although primarily depicted and described herein with respect to an embodiment in which the path loss model(s) is used to create one or more initial base station neighbor lists that is subsequently refined to create a final base station neighbor list (i.e., live network feedback information is available and is collected and evaluated in subsequent steps 714-718 to create/update a final base station neighbor list), in other embodiments in which live network feedback information is not going to be collected and evaluated, the base station neighbor list created using the finalized path loss model(s) may be a final base station neighbor list. In one embodiment, processing of estimated pilot signal strength measurements to create or update an initial base station neighbor list(s) may be performed in a manner as depicted and described herein with respect to FIG. 9.

At step 714, a base station neighbor list is distributed. In the first pass through steps 714, 716, and 718, an initial base station neighbor list is distributed. In subsequent passes through steps 714, 716, and 718, a final base station neighbor list is distributed. The base station neighbor list is distributed, by the target base station, to wireless user devices served by the target base station. The base station neighbor list may be distributed in any manner (e.g., using unicast, multicast, or broadcast channel(s), control channels, and the like). At step 716, measurement information is obtained. For example, obtained measurement information may include actual pilot signal strength measurements from wireless user devices being served by the target base station (e.g., in PCMD messages, PSMM messages, and the like).

In one embodiment, in which multiple initial base station neighbor lists are created using the path loss model(s), only one of the initial base station neighbor lists is distributed to the wireless user devices at any given time. As described herein, in one embodiment, multiple initial base station neighbor lists may be created and used to increase the amount of pilot signal strength feedback measurements that can be collected for use in creating a final base station neighbor list (e.g., where the size of base station neighbor lists is limited to a certain number of base stations). A method by which actual pilot signal strength measurements may be obtained for multiple base station neighbor lists (e.g., to increase the set of pilot signal strength measurement information available for computing a base station neighbor list) is depicted and described with respect to FIG. 8.

In one such embodiment, steps 714 and 716 are repeated for each of the initial base station neighbor lists to obtain actual pilot signal strength measurements for each of the initial base station neighbor lists, and then step 718 is performed in order to create a final base station neighbor list that is distributed to the wireless user devices and subsequently updated using subsequent pilot signal strength measurements fed back from wireless user devices. In another such embodiment, steps 714, 716, and 718 are repeated for each of the initial base station neighbor lists in order to create a final base station neighbor list, and then steps 714, 716, and 718 are repeated for the final base station neighbor list in order to continuously refine the base station neighbor list.

At step 718, the base station neighbor list is created/updated using the obtained measurement information (i.e., using actual pilot signal strength measurements and, although omitted, optionally, other information). In the first pass through steps 714, 716, and 718, a final base station neighbor list is created. In subsequent passes through steps 714, 716, and 718, the final base station neighbor list is updated. In one embodiment, processing of actual pilot signal strength measurements to create or update a final base station neighbor list may be performed in a manner as depicted and described herein with respect to FIG. 9. From step 718, method 700 returns to step 714, where the created/updated base station neighbor list is distributed for use by the wireless user devices in selecting other base stations for handoffs, as well as for collecting additional pilot signal strength measurements for refining the base station neighbor list.

As described herein, the present invention supports dynamic creation and updating of base station neighbor lists using various different algorithms utilizing different combinations of information. Since measurement-based algorithms provide better base station neighbor lists, and more measurement information further improves the optimality of the base station neighbor lists, various techniques may be used in order to increase the amount of measurement-based information (e.g., pilot signal strength measurements fed back from wireless user devices) obtained for use in creating/updating base station neighbor lists. In one embodiment, for example, multiple initial base station neighbor lists may be created and distributed to wireless user devices for increasing the number of base stations for which pilot signal strength measurements are obtained, as depicted and described with respect to FIG. 8.

Figure 8:
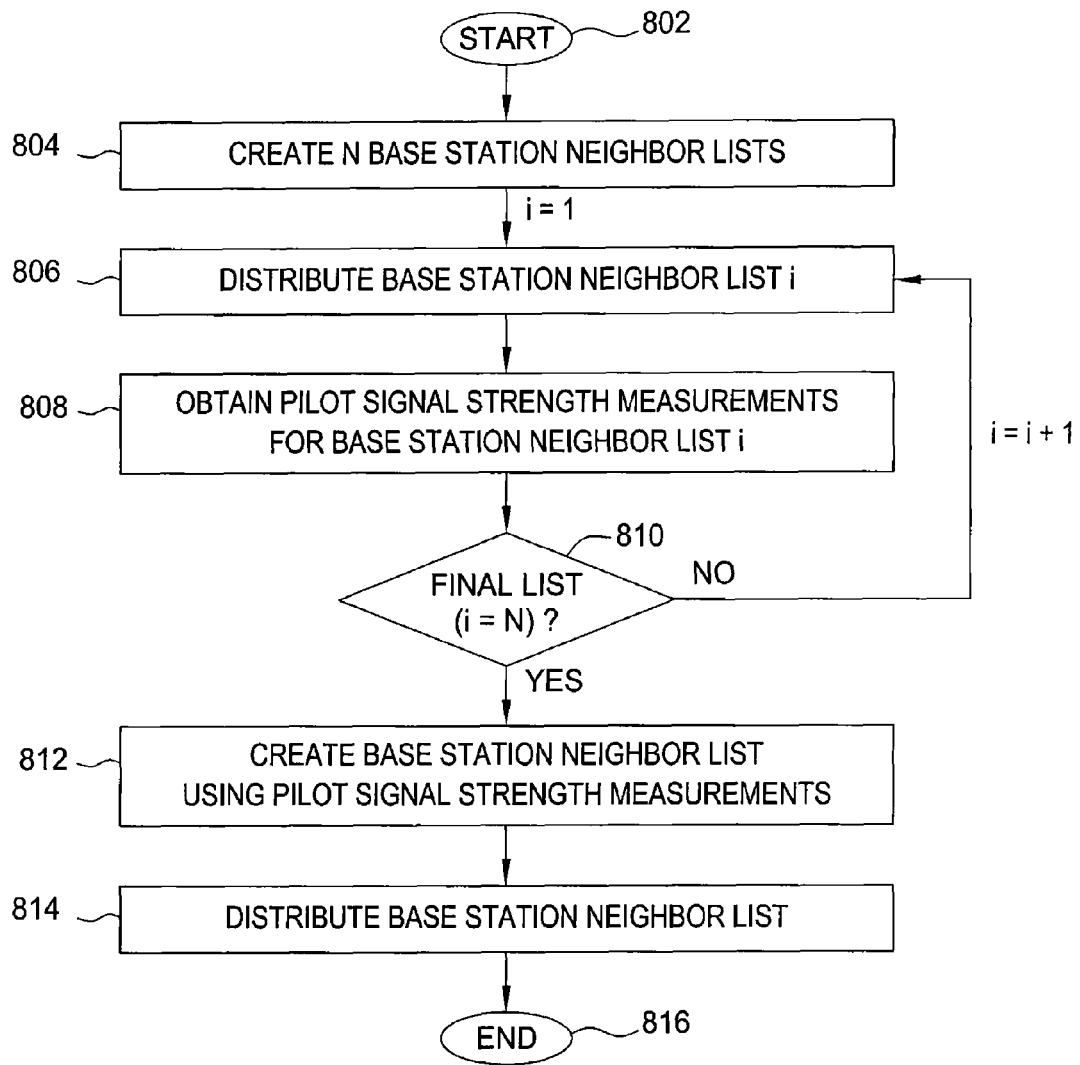
FIG. 8 depicts a method according to one embodiment of the present invention.

FIG. 8 depicts a method according to one embodiment of the present invention. Specifically, method 800 of FIG. 8 includes a method for collecting pilot signal strength measurements for base stations using multiple base station neighbor lists. Although depicted and described with respect to one base station (denoted as the target base station for which the base station neighbor list is being created), each base station may perform the pilot signal strength measurement collection process of FIG. 8. Although depicted and described as being performed serially, at least a portion of the steps of method 800 of FIG. 8 may be performed contemporaneously, or in a different order than depicted and described with respect to FIG. 8. The method 800 begins at step 802 and proceeds to step 804.

At step 804, N base station neighbor lists are created (where, although N may be equal to one, for purposes of describing method 800, we assume N>1). In one embodiment, in which multiple initial base station neighbor lists are created, the initial base station neighbor lists may be created using the same base station neighbor list creation algorithm, or one or more different base station neighbor list creation algorithms. For example, a distance-based base station neighbor list creation algorithm may be executed to create one of the initial base station neighbor lists, a model-based base station neighbor list creation algorithm may be executed to create another of the initial base station neighbor lists, and so on. In other words, the initial base station neighbor lists may be created using any combination of base station neighbor list creation algorithms.

At step 806, base station neighbor list i is distributed from the target base station to wireless user devices served by the target base station. At step 808, pilot signal strength measurements are received for base station neighbor list i. The pilot signal strength measurements are received at the target base station from the wireless user devices served by the target base station. The pilot signal strength measurements are received for base stations included in base station neighbor list i. For example, the pilot signal strength measurements may be received in PCMD messages, PSMM messages, and the like.

At step 810, a determination is made as to whether base station neighbor list i is the final base station neighbor list (i.e., whether i=N where i is used as a counter to keep track of the base station neighbor lists). If base station neighbor list i is the final base station neighbor list, method 800 proceeds to step 812. If base station neighbor list i is not the final base station neighbor list, method 800 returns to step 806 in order to distribute the next base station neighbor list and obtain pilot signal strength measurements for the next base station neighbor list (i.e., i=i+1).

At step 812, a base station neighbor list is created using the pilot signal strength measurements. In one embodiment, the base station neighbor list may be created by selecting one of the base station neighbor lists i. In one embodiment, the base station neighbor list may be created by selecting base stations from different ones of N base station neighbor lists. The base station neighbor list may be created in any manner for creating a base station neighbor list by processing actual pilot signal strength measurement. In one embodiment, processing of actual pilot signal strength measurements to create or update a final base station neighbor list may be performed in a manner as depicted and described herein with respect to FIG. 9.

At step 814, the base station neighbor list is distributed. The base station neighbor list is distributed from the target base station to wireless user devices served by the target base station. At step 816, method 800 ends. Although depicted and described as ending (for purposes of clarity), base station neighbor list update processing may be performed in order to update the base station neighbor list (e.g., using pilot signal strength measurement feedback information, as well as various other information, as depicted and described herein. In one embodiment, base station neighbor list update processing may be performed as depicted and described herein with respect to FIG. 8.

In other words, in implementations in which a large number of base stations are being considered for inclusion in a base station neighbor list, it may be desirable to obtain actual pilot signal strength measurements for as many of the candidate base stations as possible, for use in creating the best possible base station neighbor list. Since wireless user devices only feed back pilot signal strength measurements for pilot signals received from base stations on the base station neighbor list currently stored on the wireless user devices, in implementations where base station neighbor lists are limited to a small number of base stations (i.e., smaller than the number of candidate base stations), multiple base station neighbor lists including different combinations of base stations may be distributed to wireless user devices in succession so that pilot signal strength measurements may be received for different combinations of base stations, thereby increasing the total number of candidate base stations for which pilot signal strength measurements are available for use in creating/updating a final base stations neighbor list.

For example, assume that ten base stations (BS1-BS10) are being considered for inclusion in a base station neighbor list which may only include three base stations. Rather than using only one initial base station neighbor list to obtain pilot signal strength measurements, in which case pilot signal strength measurements are only received from three of the ten base stations, multiple different initial base station neighbor lists may be created and distributed in succession to obtain pilot signal strength measurements from additional base stations. For example, assume that a first, second, and third initial base station neighbor lists include base stations (BS2, BS6, and BS9), (BS4, BS6, and BS7), and (BS1, BS3, and BS9), respectively. In this example, rather than only receiving pilot signal strength measurements from BS2, BS6, and BS9, pilot signal strength measurements will be received from BS1, BS2, BS3, BS4, BS6, BS7, and BS9.

As described herein, estimated pilot signal strength measurements (generated from one or more path loss models or other comparable models) may be processed to create one or more base station neighbor lists and/or actual pilot signal strength measurements (received as feedback from wireless user terminals) may be processed to create one or more base station neighbor lists. A measurement-based base station neighbor list creation algorithm applicable to both estimated pilot signal strength measurements and actual pilot signal strength measurements (feedback measurements) is depicted and described with respect to FIG. 9.

Figure 9:
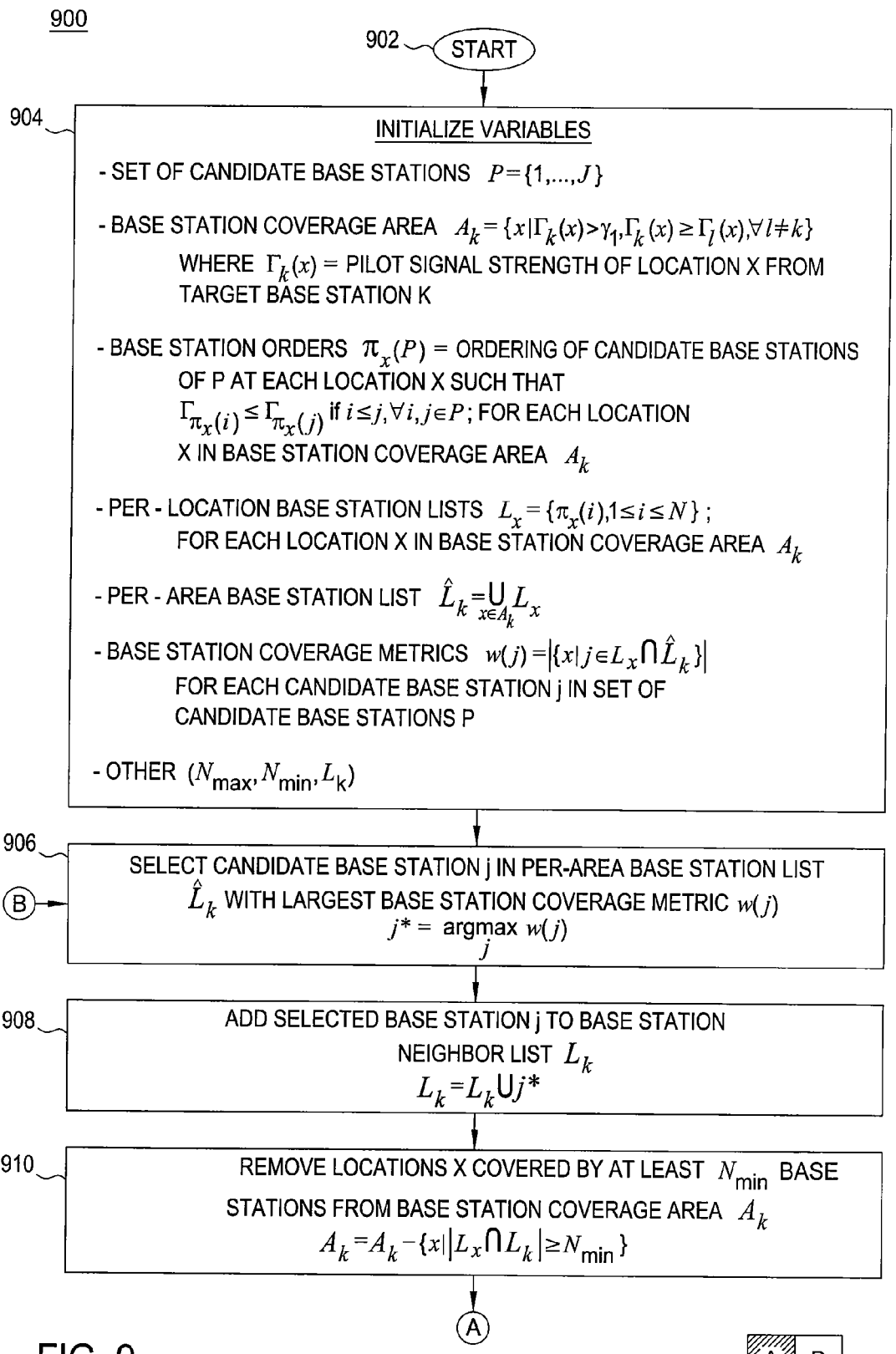
FIG. 9 depicts a method according to one embodiment of the present invention.
Figure 9:
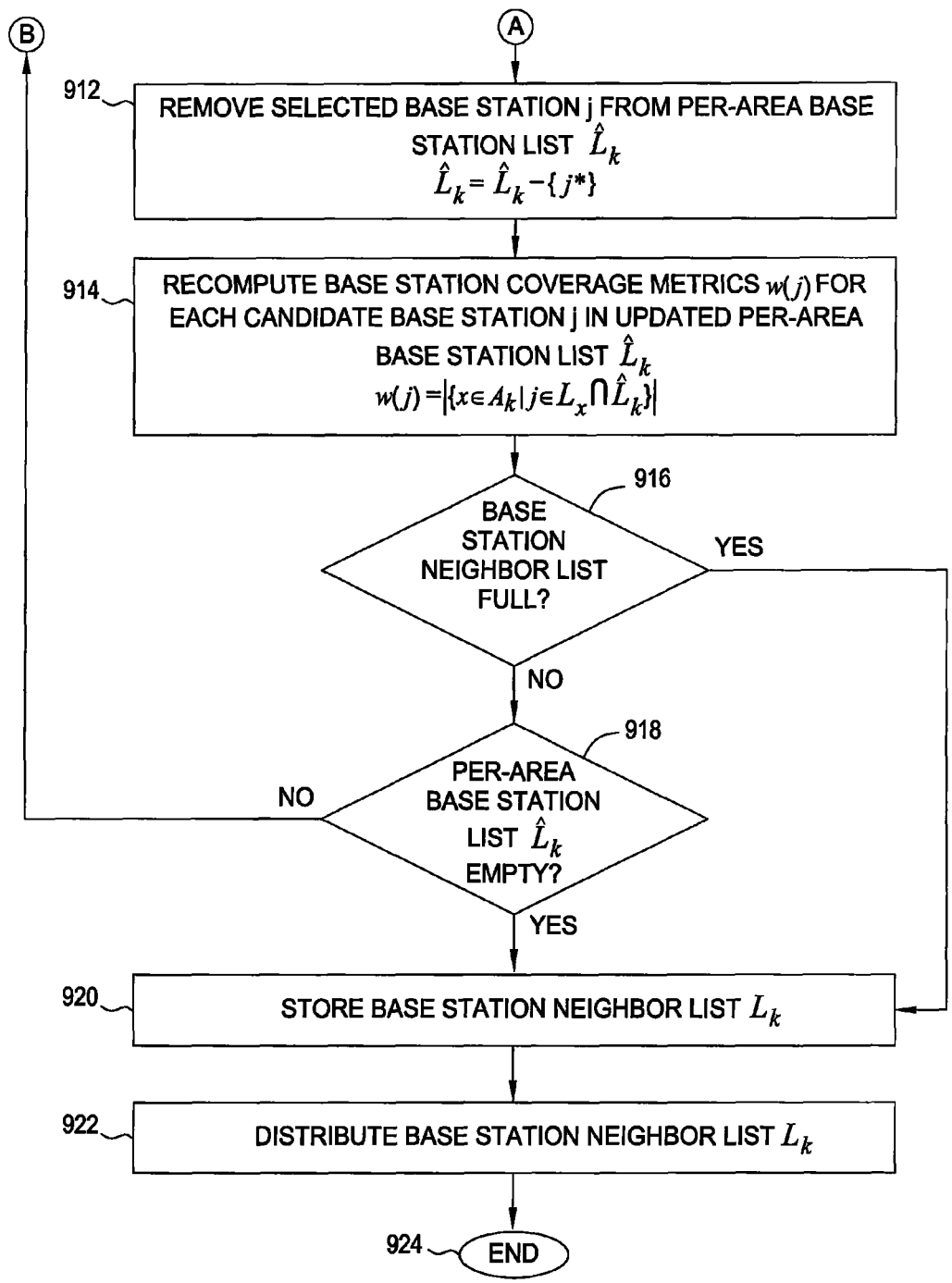
Figure 9:

FIG. 9 depicts a method according to one embodiment of the present invention. Specifically, method 900 of FIG. 9 includes a method for processing obtained information to create a base station neighbor list. In general, method 900 of FIG. 9 provides a method for creating a base station neighbor list by selecting ones of a plurality of candidate base stations for inclusion in the base station neighbor list in a manner for maximizing (or at least substantially maximizing) a number of locations in the area of the target base station receiving signal coverage from at least a threshold number of selected ones of the candidate base stations.

Although method 900 of FIG. 9 is primarily depicted and described herein with respect to one base station (denoted as the target base station for which the base station neighbor list is being created), each base station may perform the base station neighbor list creation process of FIG. 9. Although depicted and described as being performed serially, at least a portion of the steps of method 900 of FIG. 9 may be performed contemporaneously, or in a different order than depicted and described with respect to FIG. 9. The method 900 begins at step 902 and proceeds to step 904.

At step 904, variables are initialized. For purposes of clarity, assume that any required information (i.e., any information required for initializing variables and performing other steps of the base station neighbor list creation process) has been obtained as depicted and described herein. The variables include: a set of candidate base stations (denoted as P), a base station coverage area for a target base station k for which the base station neighbor list is being created (denoted as $A_k$ for base station k), location-based signal strengths (denoted as $\Gamma_k(x)$ for target base station k at location x in base station coverage area $A_k$), a base station order for each location x over the set of candidate base stations (denoted as $\pi_x(P)$), per-location base station lists (denoted as $L_x$), a per-area base station list (denoted as $\hat{L}_k$ for target base station k), and a base station coverage metric for each base station j (denoted as w(j) for base station j).

The set of candidate base stations (P) is initialized to include base stations. The set of candidate base stations may be initialized to include any base stations. The base stations selected for inclusion in the set of candidate base stations may be selected in any manner. The set of candidate base stations may include all base stations in the network. The set of candidate base stations may include neighboring base stations, e.g., determined using base station distance/location information. The set of candidate base stations may include a union of base stations included in different initial base station neighbor lists (where multiple initial base stations neighbor lists are created). The set of candidate base stations may be determined in any manner for creating a base station neighbor list described herein (e.g., using any type of evaluation of any type of information). The set of candidate base stations is initialized as P={1, ..., J}. A subset of the base stations included in the set of candidate base stations P will form the final base station neighbor list.

The base station coverage area $A_k$ for target base station k is initialized. The base station coverage area $A_k$ for target base station k includes all geographic locations (where each geographic location is denoted as location x) of the network in which the signal from target base station k is stronger than the signals from any other base stations of the network, such that a wireless user device in that area will attempt to connect to target base station k). The signal strength at location x from target base station k (denoted as $\Gamma_k(x)$) is determined from pilot signal strength measurement information, which, as described herein, may include estimated pilot signal strength measurements (generated from one or more path loss models or other models) and/or actual pilot signal strength measurements (received as feedback from wireless user terminals). The base station coverage area for target base station k is initialized as $A_k = \{x | \Gamma_k(x) > \gamma_1, \Gamma_k(x) \geq \Gamma_l(x), \text{ for all } l \neq k\}$.

The base station order for each location x over the set of candidate base stations (denoted as $\pi_x(P)$) is initialized. The base station order $\pi_x(P)$ is an ordering of the base stations of the set of candidate base stations $P = \{1, \ldots, J\}$ such that signal strength from base station i at location x is greater than signal strength from base station j at location x when i<j (where signal strength at location x from target base station k is denoted as $\Gamma_k(x)$). In other words, base station order $\pi_x(P)$ ranks all of the candidate base stations in the order of the signal strengths of those base stations at location x. The signal strength at location x from target base station k (denoted as $\Gamma_k(x)$) is determined from pilot signal strength measurement information. The base station order $\pi_x(P)$ is initialized as a permutation at location x such that $\Gamma_{\pi_x(i)} \geq \Gamma_{\pi_x(j)}$ if $i \leq j$, for all $i,j \in P$.

The per-location base station lists (denoted as $L_x$) are initialized for each location x. The per-location base station list for location x includes the N base stations having the largest signal strength at location x. The signal strength at location x is determined from pilot signal strength measurement information. The per-location base station lists $L_x$ for each of the locations x are initialized as $L_x = \{\pi_x(i), 1 \leq i \leq N\}$. The per-area base station lists (denoted as $\hat{L}_k$, and also referred to herein as comprehensive base station lists) are initialized. A per-area base station list is initialized for each base station coverage area $A_k$. The per-area base station list $\hat{L}_k$ for base station coverage area $A_k$ includes all of the base stations from the per-location base stations lists $L_x$ for all locations x that belong to base station coverage area $A_k$. The per-area base station lists $\hat{L}_k$ for each of the base station coverage areas $A_k$ are initialized as $$\hat{L}_k = \bigcup_{x \in A_k} L_x$$

The base station coverage metric for each candidate base station j (denoted as (j)) is the number of locations at which candidate base station j appears in the top N list of base stations in terms of signal strength (where signal strength is determined from pilot signal strength measurement information). This variable enables selection of base stations (for inclusion in the base station neighbor list) supporting the largest number of locations x (i.e., enabling selection of the base station covering the largest geographic area). The variable N is configurable, and may vary depending on a number of factors (e.g., the number of candidate base stations, the size of the geographic region of the network, and the like, as well as various combinations thereof. The base station coverage metric w(j) for each of the candidate base stations j are initialized as $$w(j) = |\{x \mid j \in L_x \cap \hat{L}_k\}|.$$

Using the initialized variables, an iterative process is performed in order to create the final base station neighbor list (denoted as $L_k$, and referred to more generally herein as base station neighbor list $L_k$) for the target base station k. In one embodiment, base station neighbor list $L_k$ is initialized as an empty set prior to execution of the iterative process. In one embodiment, base station neighbor list $L_k$ is not initialized prior to execution of the iterative process; rather, base station neighbor list $L_k$ may be initialized as an empty set during execution of the iterative process, or may be initialized when the first base station is selected for inclusion in base station neighbor list $L_k$. A description of the iterative process of creating base station neighbor list $L_k$ follows.

At step 906, base station j in per-area base station list $\hat{L}_k$ having the largest base station coverage metric w(j) is selected (denoted as j*). Since, as described herein, base station coverage metric w(j) is the number of locations at which candidate base station j appears in the top N list of base stations in terms of signal strength, the base station j that is selected from per-area base station list $\hat{L}_k$ is the base station that appears in the top N list of base stations (in terms of signal strength) the largest number of times. In other words, selected base station j* is the base station supporting the largest number of locations x and, thus, covering the largest geographic area. The base station j that is selected from per-area base station list is computed as j*=argmax$_j$ w(j).

At step 908, the base station j that is selected from per-area base station list $\hat{L}_k$ is added to the base station neighbor list $L_k$. The base station neighbor list $L_k$ is updated as $L_k = L_k \cup j^*$.

At step 910, one or more locations x are removed from base station coverage area $A_k$. The location(s) x removed from base station coverage area $A_k$ include any locations x which are covered by at least $N_{min}$ base stations included in base station neighbor list $L_k$. In other words, base station coverage area $A_k$ is updated as follows: $A_k = A_k - \{x | |L_x \cap L_k| \geq N_{min}\}$.

The variable $N_{min}$ specifies the minimum number of base stations that must provide coverage at any given location x. For example, for $N_{min}=1$, each location x in base station coverage area $A_k$ must be covered by at least one base station (although more base stations could cover any of the locations x). Similarly, for example, for $N_{min}=3$, each location x in base station coverage area $A_k$ must be covered by at least three base stations (although more base stations could cover any of the locations x). In other words, variable $N_{min}$ is configurable, thereby enabling the network service provider to control the level of coverage at areas covered by the target base station.

At step 912, the base station j that is added to base station neighbor list $L_k$ is removed from per-area base station list $\hat{L}_k$. In other words, per-area base station list $\hat{L}_k$ is updated as follows: $\hat{L}_k = \hat{L}_k - \{j^*\}$.

At step 914, the base station coverage metric w(j) is recomputed for each candidate base station j in the updated per-area base station list $\hat{L}_k$ using the updated base station coverage area $A_k$.

At step 916, a determination is made as to whether the base station neighbor list $L_k$ is full (i.e., as to whether $N_{max}$ candidate base stations have been added to base station neighbor list $L_k$). If the base station neighbor list $L_k$ is not full, method 900 proceeds to step 918. If the base station neighbor list $L_k$ is full, method 900 proceeds to step 920 (i.e., since the base station neighbor list $L_k$ is already full there is no need to determine whether or not the per-area base station list $\hat{L}_k$ has any remaining candidate base stations which could be added to the base station neighbor list $L_k$).

At step 918, a determination is made as to whether the per-area base station list $\hat{L}_k$ is empty (i.e., since the base station neighbor list $L_k$ is not full, if there are any candidate base stations remaining in per-area base station list $\hat{L}_k$, at least some of the remaining candidate base stations may be selected by repeating steps 906-914). If per-area base station list $\hat{L}_k$ is not empty, method 900 returns to step 906 (i.e., the base station neighbor list $L_k$ is not complete). If per-area base station list $\hat{L}_k$ is empty, method 900 proceeds to step 920 (i.e., even though base station neighbor list $L_k$ has not exceeded the maximum size limitation $N_{max}$, the base station neighbor list $L_k$ is complete).

At step 920, the base station neighbor list $L_k$ is stored. At step 922, the base station neighbor list $L_k$ is distributed to wireless user devices served by the target base station. The base station neighbor list $L_k$ may be distributed to wireless user devices in any manner. At step 924, method 900 ends.

As described herein, after a base station neighbor list is created for a base station, conditions may change which may render the base station neighbor list less useful than it otherwise could be based on the changed conditions. This is especially true in dynamic wireless networks, such as in deployable wireless networks, as depicted and described with respect to FIG. 1. Thus, to ensure that each base station has an optimum base station neighbor list, the base station neighbor list may be updated. A base station neighbor list may be updated either periodically (e.g., based on an assumption that network conditions will change over time) or in response to changes to one or more conditions (e.g., by monitoring for or periodically checking for changes to one or more conditions which contribute to creation of the base station neighbor list). A method for updating a base station neighbor list is depicted and described herein with respect to FIG. 10.

Figure 10:
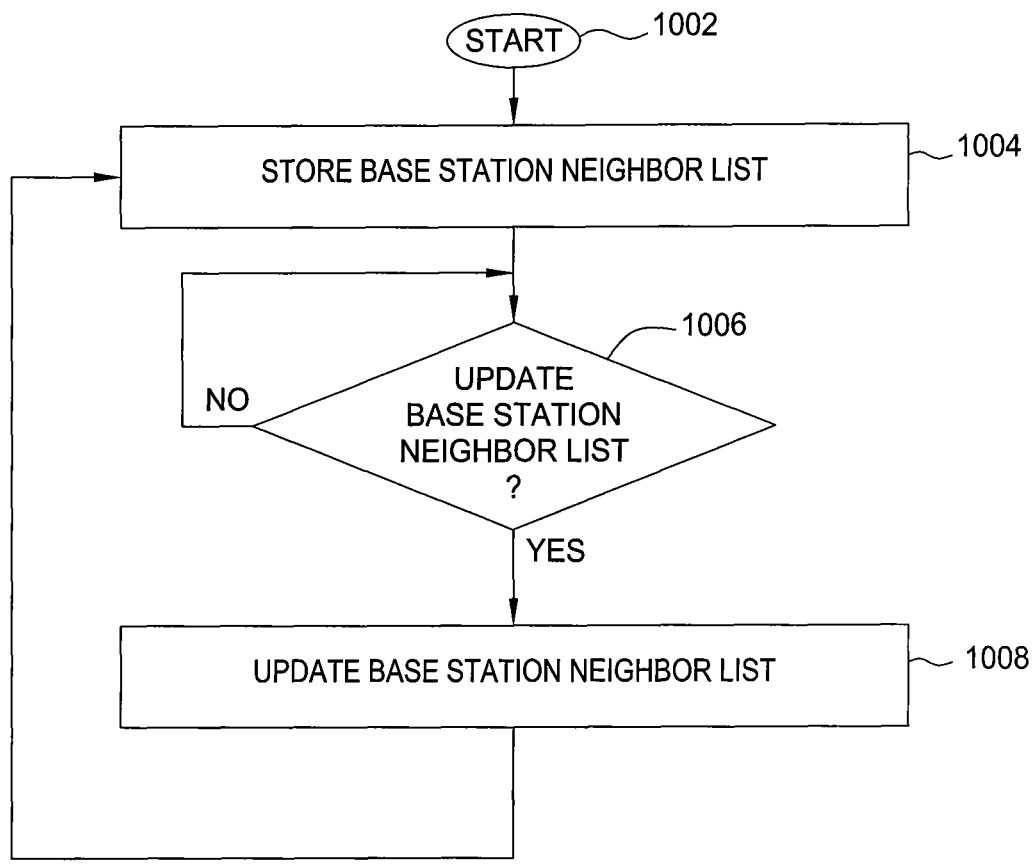
FIG. 10 depicts a method according to one embodiment of the present invention.

FIG. 10 depicts a method according to one embodiment of the present invention. Specifically, method 1000 of FIG. 10 includes a method for updating a base station neighbor list. Although depicted and described with respect to one base station, each base station in the wireless network may perform the base station neighbor list update process depicted and described with respect to method 1000 of FIG. 10. Although depicted and described as being performed serially, at least a portion of the steps of method 1000 of FIG. 10 may be performed contemporaneously, or in a different order than depicted and described with respect to FIG. 10. The method 1000 begins at step 1002 and proceeds to step 1004.

At step 1004, a base station neighbor list is stored. The base station neighbor list that is stored may be any base station neighbor list (e.g., initial, final, and the like) created using any method for creating a base station neighbor list (e.g., using one or more of methods 500-900 of FIGS. 5-9, respectively) or updated using any method for updating a base station neighbor list (e.g., using one or more of methods 500-1000 of FIGS. 5-10, respectively) Although primarily depicted described as an explicit step of storing the base station neighbor list, in some embodiment a base station neighbor list stored in memory may simply be updated while stored in memory such that the steps of updating and storing the base station neighbor list are performed contemporaneously.

At step 1006, a determination is made as to whether to update the base station neighbor list. The determination as to whether to update the base station neighbor list is dependent upon the type(s) of update trigger(s) used (e.g., periodic updates, event-triggered updates, and the like, as well as various combinations thereof). If the base station neighbor list should not be updated, method 1000 remains at step 1006 (i.e., after a base station neighbor list is created and stored at a target base station, method 1000 loops within step 1006 until the base station determines that the base station neighbor list should be updated). If the base station neighbor list should be updated, method 1000 proceeds to step 1008.

The updating of a base station neighbor list may be initiated in a number of ways. The updating of a base station neighbor list may be initiated periodically. The updating of a base station neighbor list may be initiated in response to an event. In one embodiment, updating of a base station neighbor list may be performed using a combination of periodic updates and event-triggered updates. In this combined embodiment, the base station is monitored for events (or conditions) which may cause updates to a base station neighbor list and the associated base station neighbor list is updated in response to detecting a trigger condition, but if no trigger condition is detected after a predetermined amount of time, the base station neighbor list is updated anyway (i.e., in response to a periodic trigger).

At step 1008, the base station neighbor list is updated. In one embodiment, the base station neighbor list is updated by creating a new base station neighbor list and replacing the original base station neighbor list with the new base station neighbor list. In one such embodiment, the new base station neighbor list may be created using one or more of methods 500-900 of FIGS. 5-9, respectively. In one embodiment, the base station neighbor list is updated by processing the existing base station neighbor list to change the base stations included in the base station neighbor list and/or to change the priority of base stations included in the base station neighbor list. From step 1008, method 1000 returns to step 1004 (i.e., the process is repeated to maintain an optimum base station neighbor list at the base station).

In one embodiment, in which a base station neighbor list is updated periodically, the base station neighbor list may be updated with any periodicity (e.g., once per hour, once every four hours, once per day, and the like). In one embodiment, the periodicity may vary for different base stations within a network. The periodicity may vary for different networks. The periodicity may be set by an administrator, and may be modified on-the-fly (e.g., either by an administrator or automatically by a base station or a management system) as required. As described herein, periodic updates of base station neighbor lists may be used in combination with event-based updates of base station neighbor lists (which may be alternatively referred to herein as condition-based updates).

In embodiments using condition-based updates of base station neighbor lists (with or without corresponding periodic updates), a condition which triggers an update of a base station neighbor list may include one or more of: a change of any of the information from which the base station neighbor list was created/updated (e.g., a change in the value(s) of one or more parameter(s)) obtained as part of the information obtained for creating or updating the base station neighbor list), a base station leaving or joining the network, and the like, as well as various combinations thereof. In such embodiments, a base station may automatically be notified of some such conditions, may continuously monitor for some such conditions and/or may periodically check for some such conditions (e.g., using periodic monitoring, probing, and the like). In other words, a base station may use a combination of automatic notification, continuous monitoring, and periodic checking (e.g., using different techniques for different conditions).

In embodiments in which changes to value(s) of parameter(s) result in conditions which trigger base station neighbor list updates, the parameters may include at least a portion of the parameters evaluated for creating and prioritizing base station neighbor lists. In one embodiment, the determination as to whether to update a base station neighbor list may be dependent on a number of factors, such as the current values of the parameters (e.g., where the value of a parameter changes such that a threshold is satisfied or no longer satisfied), the amount/percentage by which values of parameters have changed, the number of parameters for which associated values have changed, and the like, as well as various combinations thereof. The type of change(s) that triggers an update of the base station neighbor list may be different for different parameters.

In one embodiment, where a base station changes its geographic location by more than a threshold amount, the base station that changed geographic location may update its base station neighbor list, and may propagate the geographic location change to other base stations (for use by those base stations in determining whether or not to update their respective base station neighbor lists).

In one embodiment, where a base station receives geographic location information from a base station not currently included on the base station neighbor list stored at that base station, if the geographic location of the base station has changed such that geographic proximity of the base stations has changed by a threshold amount (e.g., such that the base stations are now close enough to justify inclusion of that base station on the base station neighbor list), the base station receiving the geographic location information may update the base station neighbor list to include the base station from which the geographic location is received (or may further evaluate the base station from which the geographic location is received, e.g., for purposes of determining whether or not to add the base station to the base station neighbor list).

In one embodiment, where a base station receives geographic location information from a base station currently included on the base station neighbor list stored at that base station, if the geographic location of the base station has changed such that geographic proximity of the base stations has changed by a threshold amount, the base station may recreate a new base station neighbor list, or may simply update the existing base station neighbor list (e.g., by adjusting the priority of that base station either up or down depending on whether the base stations are more or less proximate, by removing that base station from the base station neighbor list if the base stations are no longer proximate, and the by performing like functions, as well as various combinations thereof.

In one embodiment, changes to values of one or more network status parameters may trigger a base station neighbor list update.

With respect to existence of connectivity between a target base station and another base station, for example, loss of connectivity between the target base station and a base station currently included in the base station neighbor list may result in removal of that base station from the base station neighbor list. Similarly, for example, newly detected connectivity between a target base station and a candidate base station (which is in geographical proximity to the target base station but not currently included in the base station neighbor list) may result in re-evaluation of that candidate base station for inclusion in the base station neighbor list (e.g., by evaluating values of one or more other parameters).

With respect to other connectivity status parameters (e.g., capacity, load, delay, error, and the like), base station load parameters, and the like, changes of the values of one or more such parameters for a base station currently included in a base station neighbor list may result in reprioritization of that base station within the base station neighbor list (e.g., moving up or down in priority depending on whether the values are more or less desirable than before), or removal of that base station from the base station neighbor list (e.g., where values of one or more of the parameters render that base station undesirable as an option of handoffs of wireless user devices served by the target base station). Similarly, for example, changes of the values of one or more such parameters for a base station not currently included in a base station neighbor list may result in addition of that base station to the base station neighbor list.

In one embodiment, as new pilot signal strength measurement information is obtained (e.g., estimated from path loss models executed for the target base station and/or received from wireless user devices served by the target base station), the target base station may revaluate the existing base station neighbor list. In one embodiment, the target base station may reprioritize the base stations in the base station neighbor list based on the new pilot signal strength measurement information. In one embodiment, in which pilot signal strength measurement information is used for creating the base station neighbor list, the target base station may modify one or more base stations included in the base station neighbor list (e.g., by removing one or more base stations from the base station neighbor list or adding one or more base stations to the base station neighbor list).

In one embodiment, the base station neighbor list of a target base station may be updated when a base station leaves the network or joins the network. In one embodiment, when an existing base station leaves the network (e.g., travels out of a particular region in which the network is deployed, is powered off, and the like), any base station neighbor list including that base station may be updated to remove that base station from the base station neighbor list). In one embodiment, when a new base station joins the network, upon learning of the existence of the new base station (e.g., where the new base may announce itself to other base stations in the network or existing base stations may detect the existence of the new base station), existing base stations may evaluate that new base station for inclusion in their respective base station neighbor lists (e.g., using any process for evaluating one or more base stations for inclusion in a base station neighbor list).

As described herein, in some embodiments, a base station neighbor list maintained for a target base station may have maximum size limit. In such embodiments, the determination as to whether or not to update the base station neighbor list may be dependent on the current size of the base station neighbor list with respect to the maximum size limit of the base station neighbor list.

In one example, where a new candidate base station is identified (e.g., a base station joins the network in the vicinity of the target base station, a base station travels within the vicinity of the target base station, values of one or more parameters for the base station change, and the like): if the current size of the base station neighbor list is less than the maximum size limit of the base station neighbor list, the new candidate base station is added to the base station neighbor list; however, if the current size of the base station neighbor list has reached the maximum size limit of the base station neighbor list, the new candidate base station may or may not be added to the base station neighbor list (i.e., additional evaluation is required). An evaluation may be performed to compare the new candidate base station with the lowest priority base station of the base station neighbor list to determine whether to replace an existing base station with the new candidate base station.

In one example, where one of the base stations is removed from the base station neighbor list (e.g., the base station neighbor list leaves the network, the base station travels out of the vicinity of the target base station, values of one or more parameters for the base station change, and the like): if the current size of the base station neighbor list is less than the maximum size limit of the base station neighbor list, then no additional base stations are added to the base station neighbor list (because there was already room in the base station neighbor list for other base stations); however, if the current size of the base station neighbor list has reached the maximum size limit of the base station neighbor list, the base station removed from the base station neighbor list may be replaced with a different base station. An evaluation may be performed to select a base station to replace the removed base station in the base station neighbor list.

As described herein, where a base station neighbor list maintained for a target base station has a maximum size limit, different evaluations may need to be performed in order to determine whether or not to update a base station neighbor list and, also, in order to determine how the base station neighbor list should be updated. The evaluations may be performed using any of the base station neighbor list creation processes depicted and described herein. An example of one such embodiment, in which a new base station is identified within the vicinity of a target base station that has a base station neighbor list including the maximum number of allowed base stations, is depicted and described herein with respect to FIG. 11.

Figure 11:
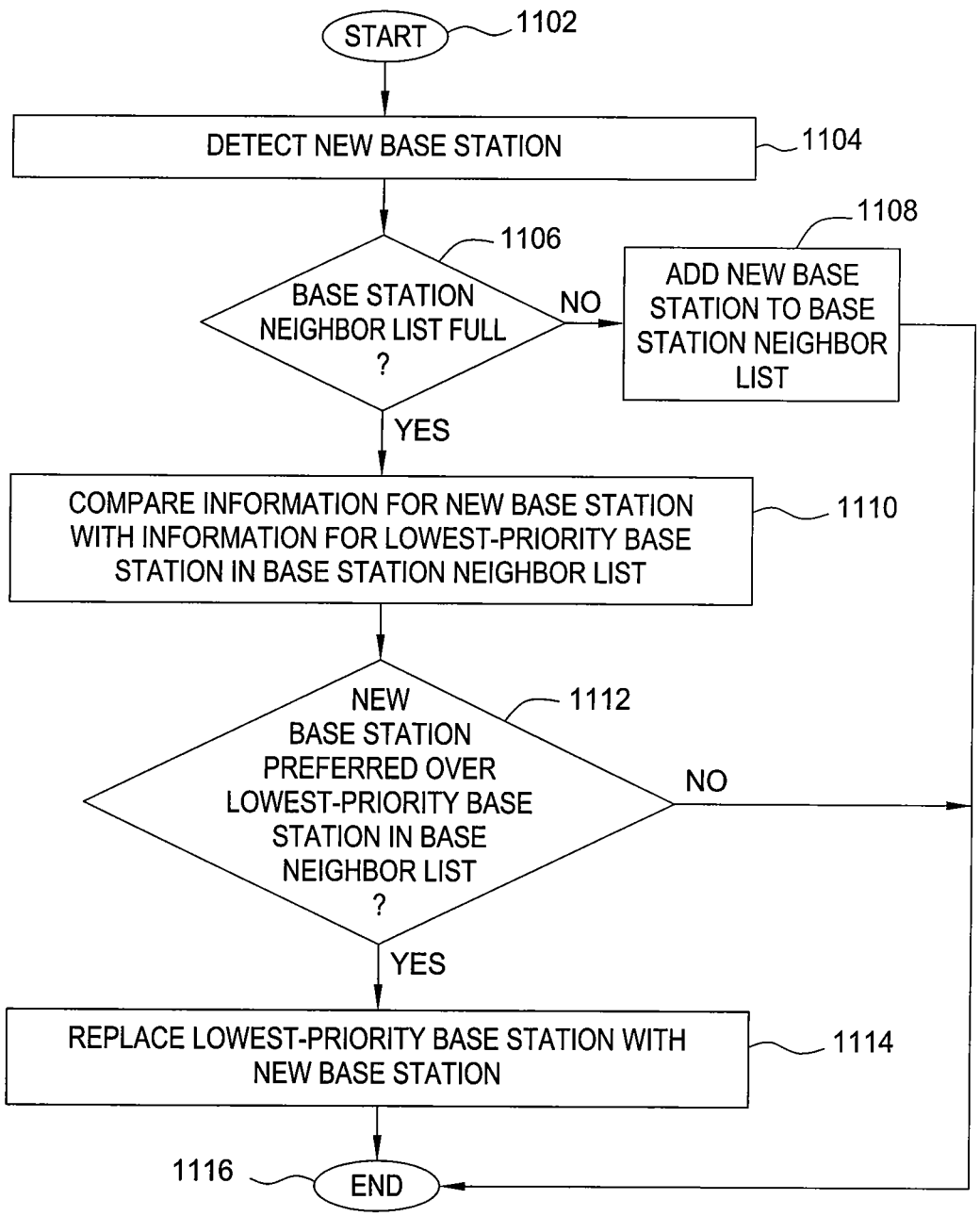
FIG. 11 depicts a method according to one embodiment of the present invention.

FIG. 11 depicts a method according to one embodiment of the present invention. Specifically, method 1100 of FIG. 11 includes a method for determining whether to update a base station neighbor list at a target base station when a new base station is identified by the target base station. Although depicted and described with respect to one base station, each base station in the vicinity of the new base station may perform the base station neighbor list update process depicted and described with respect to method 1100 of FIG. 11. Although depicted and described as being performed serially, at least a portion of the steps of method 1100 of FIG. 11 may be performed contemporaneously, or in a different order than depicted and described with respect to FIG. 10. The method 1100 begins at step 1102 and proceeds to step 1104.

At step 1104, a new base station is detected. The new base station is detected in the vicinity of a target base station (i.e., close enough such that the target base station may want to considered the new base station for inclusion in its base station neighbor list). The new base station may be detected for many different reasons. The new base station may be detected in many different ways.

At step 1106, a determination is made as to whether the base station neighbor list of the target base station is full (i.e., whether the base station neighbor list of the target base station includes the maximum possible number of base stations which may be supported by a base station neighbor list). If the base station neighbor list is not full, method 1100 proceeds to step 1108. At step 1108, the target base station adds the new base station to the base station neighbor list and, from step 1108, method 800 proceeds to step 1116, where method 1100 ends. If the base station neighbor list is full, method 1100 proceeds to step 1110 in order to determine whether or not to replace an existing base station of the base station neighbor list with the new base station.

At step 1110, information for the new base station is compared with information for the lowest-priority base station in the base station neighbor list. The information is compared in a manner for determining whether the new base station is preferred over the lowest-priority base station in the base station neighbor list. The information may include any information, such as geographic location information, network status information, and the like, as well as various combinations thereof. The information may be compared using any form of evaluation (e.g., using one or more of methods 500-1000 of FIGS. 5-10, respectively). Although omitted for purposes of clarity, in one embodiment, in which the base stations of the base station neighbor list are not prioritized, the information for the new base station may be compared with information for each of the base stations in the base station neighbor list.

At step 1112, a determination is made as to whether the new base station is preferred over the lowest-priority base station in the base station neighbor list (or, alternatively, whether the lowest-priority base station is preferred). If the new base station is not preferred over the lowest-priority base station in the base station neighbor list, method 1100 proceeds to step 1116, where method 1100 ends. If the new base station is preferred over the lowest-priority base station in the base station neighbor list, method 1100 proceeds to step 1114. At step 1114, the lowest priority base station in the base station neighbor list is replaced with the new base station to form the updated base station neighbor list. At step 1116, method 1100 ends.

Although primarily depicted and described herein with respect one target base station, for an event affecting multiple target base stations (e.g., a base station joining the network in the vicinity of multiple existing base stations, a base station moving within the network to an area in the vicinity of multiple existing base stations, and the like), base station neighbor list update processing is performed for each of the base stations affected by the event in order to determine whether or not to update base station neighbor lists of each of the base stations affected by the event, respectively. Furthermore, as described herein, base station neighbor list update processing may be performed using any of the base station neighbor list creation processing depicted and described herein.

As described herein, although primarily depicted and described herein with respect to using specific information in a specific order/combination for creating/prioritizing base station neighbor lists, less or more information may be used, in any order and/or combination, for creating/prioritizing base station neighbor lists. Although primarily depicted and described herein with respect to using specific information in a specific order/combination for updating base station neighbor lists, less or more information may be used, in any order and/or combination, for updating base station neighbor lists. Although primarily depicted and described herein with respect to embodiments in which a base station creates its own base station neighbor list, in other embodiments a central control may create/update base station neighbor lists and distribute the base station neighbor lists to the associated base stations.

Figure 12:
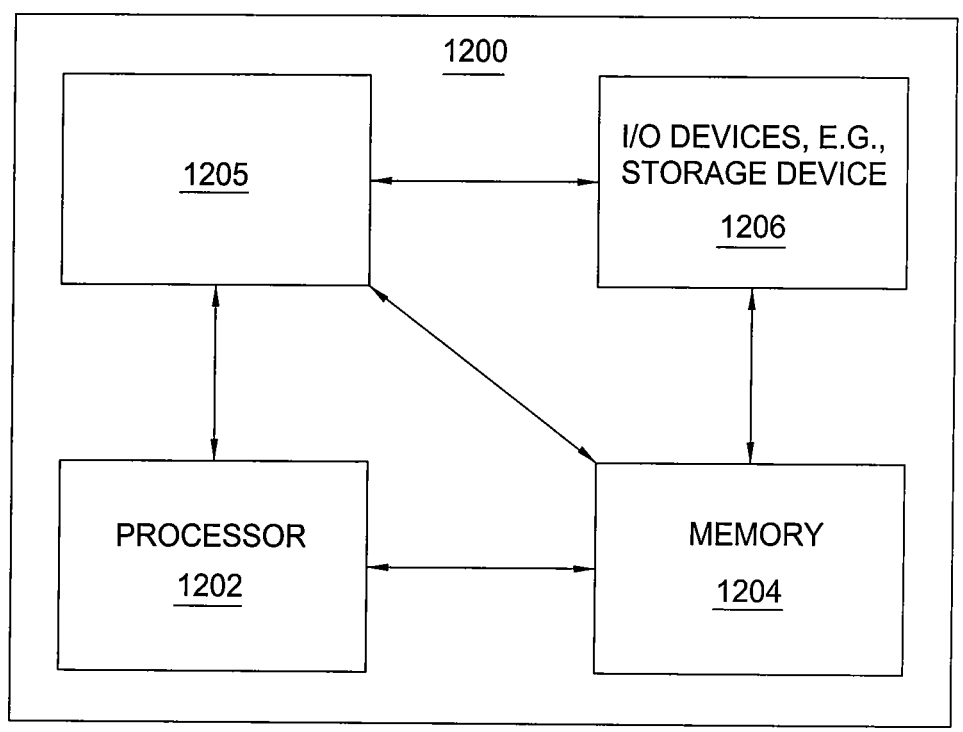
FIG. 12 depicts a high-level block diagram of a general-purpose computer suitable for use in performing the functions described herein.

FIG. 12 depicts a high-level block diagram of a general-purpose computer suitable for use in performing the functions described herein. As depicted in FIG. 12, system 1200 comprises a processor element 1202 (e.g., a CPU), a memory 1204, e.g., random access memory (RAM) and/or read only memory (ROM), a base station neighbor list management module 1205, and various input/output devices 1206 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present base station neighbor list management process 1205 can be loaded into memory 1204 and executed by processor 1202 to implement the functions as discussed above. As such, base station neighbor list management process 1205 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Furthermore, although primarily depicted and described herein with respect to rapidly deployable networks, the present invention may be used to dynamically create/update base station neighbor lists for any type of base station deployed in any type of network. Moreover, although primarily depicted and described herein with respect to dynamically creating/updating base station neighbor lists, the present invention may be used to create/update neighbor lists for any other transmission equipment requiring neighbor lists. Thus, the present invention is not intended to be limited by the type of wireless network or type of wireless transmission equipment depicted and described herein.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for creating a base station neighbor list for use in a wireless network, wherein the wireless network comprises a plurality of base stations including a target base station for which the base station neighbor list is created and a plurality of other base stations available for inclusion in the base station neighbor list, wherein the wireless network is a mesh wireless network in which the base stations are configured for supporting wireless communications between the base stations, the method comprising:
   using a processor for:
      obtaining information for creating the base station neighbor list, wherein the obtained information comprises base station connectivity information comprising information identifying at least one of the other base stations with which the target base station currently supports a respective wireless connection configured to support transport of user traffic between the target base station and the other base station;
      creating the base station neighbor list using the obtained information; and
      storing the created base station neighbor list.

2. The method of claim 1, wherein the base station connectivity information further comprises at least one of:
   information indicative of connection quality of at least one wireless connection currently supported between the target base station and at least one of the other base stations; and
   information indicative of compatibility of the target base station with at least one of the other base stations with which the target base station currently supports a respective wireless connection.

3. The method of claim 1, wherein obtaining the information further comprises at least one of:
   obtaining pilot signal strength measurement information associated with the target base station; and
   obtaining base station load information indicative of base station load supported by at least one of the other base stations.

4. The method of claim 3, wherein obtaining the pilot signal strength measurement information associated with the target base station comprises at least one of:
   estimating pilot signal strength measurements using at least one path loss model; and
   receiving pilot signal strength measurements from a plurality of wireless user devices served by the target base station.

5. The method of claim 1, wherein creating the base station neighbor list comprises:
   selecting at least one of the other base stations to include in the base station neighbor list using at least a portion of the obtained information.

6. The method of claim 1, wherein creating the base station neighbor list comprises:
   generating a list of base stations including a plurality of the other base stations; and
   filtering the list of base stations using at least a portion of the obtained information to create the base station neighbor list.

7. The method of claim 6, wherein generating the list of base stations comprises:
   determining geographic distances between the target base station and the ones of the other base stations for which geographic locations are obtained; and
   selecting at least a portion of the ones of the other base stations for which geographic locations are obtained for inclusion in the list of base stations using the associated geographic distances.

8. The method of claim 1, wherein creating the base station neighbor list further comprises:
  prioritizing the base stations included in the base station neighbor list.

9. The method of claim 8, wherein prioritizing the base stations included in the base station neighbor list comprises:
  prioritizing the base stations included in the base station neighbor list using at least a portion of the obtained information.

10. The method of claim 8, wherein prioritizing the base stations included in the base station neighbor list comprises:
  obtaining pilot signal strength measurement information; and
  prioritizing the base stations included in the base station neighbor list using the pilot signal strength measurement information.

11. The method of claim 10, wherein obtaining the pilot signal strength measurement information comprises at least one of:
  estimating pilot signal strength measurements using at least one path loss model; and
  receiving pilot signal strength measurements from a plurality of wireless user devices served by the target base station.

12. The method of claim 1, further comprising:
  propagating the base station neighbor list toward a plurality of wireless user devices served by the target base station.

13. An apparatus for creating a base station neighbor list for use in a wireless network, wherein the wireless network comprises a plurality of base stations including a target base station for which the base station neighbor list is created and a plurality of other base stations available for inclusion in the base station neighbor list, wherein the wireless network is a mesh wireless network in which the base stations are configured for supporting wireless communications between the base stations, the apparatus comprising:
  a processor configured to:
    obtain information for creating the base station neighbor list, wherein the obtained information comprises base station connectivity information comprising information identifying at least one of the other base stations with which the target base station currently supports a respective wireless connection configured to support transport of user traffic between the target base station and the other base station;
    create the base station neighbor list using the obtained information; and
    store the created base station neighbor list.

14. The apparatus of claim 13, wherein the base station connectivity information further comprises at least one of:
  information indicative of connection quality of at least one wireless connection currently supported between the target base station and at least one of the other base stations; and
  information indicative of compatibility of the target base station with at least one of the other base stations with which the target base station currently supports a respective wireless connection.

15. The apparatus of claim 13, wherein the processor is configured to obtain the information by at least one of:
  obtaining pilot signal strength measurement information associated with the target base station; and
  obtaining base station load information indicative of base station load supported by at least one of the other base stations.

16. The apparatus of claim 15, wherein the processor is configured to obtain the pilot signal strength measurement associated with the target base station by at least one of:
  estimating pilot signal strength measurements using at least one path loss model; and
  receiving pilot signal strength measurements from a plurality of wireless user devices served by the target base station.

17. The apparatus of claim 13, wherein the processor is configured to create the base station neighbor list by:
  selecting at least one of the other base stations to include in the base station neighbor list using at least a portion of the obtained information.

18. The apparatus of claim 13, wherein the processor is configured to create the base station neighbor list by:
  generating a list of base stations including a plurality of the other base stations; and
  filtering the list of base stations using at least a portion of the obtained information to create the base station neighbor list.

19. The apparatus of claim 18, wherein generating the list of base stations comprises:
  determining geographic distances between the target base station and the ones of the other base stations for which geographic locations are obtained; and
  selecting at least a portion of the ones of the other base stations for which geographic locations are obtained for inclusion in the list of base stations using the associated geographic distances.

20. The apparatus of claim 13, wherein the processor is configured to create the base station neighbor list by:
  prioritizing the base stations included in the base station neighbor list.

21. The apparatus of claim 20, wherein prioritizing the base stations included in the base station neighbor list comprises:
  prioritizing the base stations included in the base station neighbor list using at least a portion of the obtained information.

22. The apparatus of claim 20, wherein prioritizing the base stations included in the base station neighbor list comprises:
  obtaining pilot signal strength measurement information; and
  prioritizing the base stations included in the base station neighbor list using the pilot signal strength measurement information.

23. The apparatus of claim 22, wherein obtaining the pilot signal strength measurement information comprises at least one of:
  estimating pilot signal strength measurements using at least one path loss model; and
  receiving pilot signal strength measurements from a plurality of wireless user devices served by the target base station.

24. The apparatus of claim 13, wherein the processor is configured to:
  propagate the base station neighbor list toward a plurality of wireless user devices served by the target base station.

25. A method for creating a base station neighbor list for a target base station in a wireless network comprising a plurality of base stations, wherein the wireless network is a mesh wireless network in which the base stations are configured for supporting wireless communications between the base stations, the method comprising:
  using a processor for:
    determining a list of candidate base stations considered for inclusion in the base station neighbor list using a geographical location of the target base station and geographical locations of other base stations of the wireless network;

obtaining network status information associated with the candidate base stations, wherein the obtained network status information comprises connectivity information comprising information identifying at least one of the other base stations with which the target base station currently supports a respective wireless connection configured to support transport of user traffic between the target base station and the other base station;

filtering the list of candidate base stations using the obtained network status information;

prioritizing candidate base stations included in the filtered list of candidate base stations to form the base station neighbor list; and storing the base station neighbor list.

* * * * *